US012469901B1

United States Patent
Liu

(10) Patent No.: US 12,469,901 B1
(45) Date of Patent: Nov. 11, 2025

(54) THERMAL MANAGEMENT SYSTEM AND THERMAL MANAGEMENT METHOD OF ELECTRIC MOTORCYCLE

(71) Applicant: Shenzhen Kaixiang Intelligent Technology Co., Ltd, Guangdong (CN)

(72) Inventor: Xiaofen Liu, Guangdong (CN)

(73) Assignee: Shenzhen Kaixiang Intelligent Technology Co., Ltd, Shenzhen (CN)

( * ) Notice: Subject to any disclaimer, the term of this patent is extended or adjusted under 35 U.S.C. 154(b) by 0 days.

(21) Appl. No.: 18/977,250

(22) Filed: Dec. 11, 2024

(30) Foreign Application Priority Data

Nov. 5, 2024 (CN) .......................... 202411572974.7

(51) Int. Cl.
*H01M 10/6568* (2014.01)
*B60L 58/24* (2019.01)
(Continued)

(52) U.S. Cl.
CPC ......... *H01M 10/6568* (2015.04); *B62J 41/00* (2020.02); *B62J 43/16* (2020.02);
(Continued)

(58) Field of Classification Search
CPC ........... H01M 10/6568; H01M 10/482; H01M 10/486; H01M 10/613; H01M 10/615;
(Continued)

(56) References Cited

U.S. PATENT DOCUMENTS 5,678,760 A * 10/1997 Muso .................. H01M 10/635
165/41
5,834,132 A * 11/1998 Hasegawa ........... H01M 10/657
429/62
(Continued)

FOREIGN PATENT DOCUMENTS

CN 108028446 A * 5/2018 .......... H01M 50/209
CN 109830775 A * 5/2019
(Continued)

OTHER PUBLICATIONS

CN 117525673A Machine Translation (Year: 2024).*
European Search Report for Application No. 24223112.4 mailed Jun. 10, 2025, 16 pages.

*Primary Examiner* — Len Tran
*Assistant Examiner* — Gustavo A Hincapie Serna
(74) *Attorney, Agent, or Firm* — Brooks Kushman P.C.

(57) ABSTRACT

A thermal management system and a thermal management method for electric motorcycles. A first liquid flow loop flows through a battery module in a battery housing and is connected to the battery housing, a second liquid flow loop includes a liquid flow channel of the battery housing and a liquid flow channel of a motor housing, a thermal management controller has a signal connection with a first control valve in the first liquid flow loop and a second control valve in the second liquid flow loop, respectively, so as to control a liquid flow state of the first liquid flow loop, a liquid flow state of the liquid flow channel of the battery housing and a liquid flow state of the liquid flow channel of the motor housing. The electric motorcycle is enabled to have a better heat dissipation effect during the driving process and the charging process.

17 Claims, 14 Drawing Sheets

(51) Int. Cl.
| | |
|---|---|
| *B62J 41/00* | (2020.01) |
| *B62J 43/16* | (2020.01) |
| *B62K 11/00* | (2006.01) |
| *H01M 10/48* | (2006.01) |
| *H01M 10/613* | (2014.01) |
| *H01M 10/615* | (2014.01) |
| *H01M 10/625* | (2014.01) |
| *H01M 10/633* | (2014.01) |
| *H01M 10/653* | (2014.01) |
| *H01M 10/6551* | (2014.01) |
| *H01M 10/6552* | (2014.01) |
| *H01M 10/6556* | (2014.01) |
| *H01M 10/658* | (2014.01) |

(52) U.S. Cl.
CPC ....... *H01M 10/482* (2013.01); *H01M 10/486* (2013.01); *H01M 10/613* (2015.04); *H01M 10/615* (2015.04); *H01M 10/625* (2015.04); *H01M 10/633* (2015.04); *H01M 10/653* (2015.04); *H01M 10/6551* (2015.04); *H01M 10/6552* (2015.04); *H01M 10/6556* (2015.04); *H01M 10/658* (2015.04); *B60L 58/24* (2019.02); *B60L 2200/12* (2013.01); *B62K 11/00* (2013.01); *B62K 2204/00* (2013.01); *H01M 2220/20* (2013.01)

(58) Field of Classification Search
CPC ............. H01M 10/625; H01M 10/633; H01M 10/653; H01M 10/6551; H01M 10/6552; H01M 10/6556; H01M 10/658; H01M 2220/20; B62J 41/00; B62J 43/16; B62K 11/00; B62K 2204/00; B60H 1/00278; B60K 11/02; B60L 58/24; B60L 2200/12
USPC ........................................................ 165/287
See application file for complete search history.

(56) References Cited

U.S. PATENT DOCUMENTS

| | | | | |
|---|---|---|---|---|
| 10,434,861 B2 * | 10/2019 | Narisawa | ................. | B60K 1/04 |
| 11,919,360 B2 * | 3/2024 | Takagi | ............... | B60H 1/32284 |
| 2004/0124722 A1 * | 7/2004 | Uchida | ................. | B60L 50/16 |
| | | | | 903/952 |
| 2012/0028135 A1 * | 2/2012 | Ohashi | .................... | B60L 50/72 |
| | | | | 429/400 |
| 2012/0297809 A1 * | 11/2012 | Carpenter | ............... | B60L 58/26 |
| | | | | 62/239 |
| 2013/0111932 A1 * | 5/2013 | Mishima | ................. | B60L 58/27 |
| | | | | 62/159 |
| 2014/0193683 A1 * | 7/2014 | Mardall | ................... | B60K 1/04 |
| | | | | 429/99 |
| 2017/0284062 A1 * | 10/2017 | Osaka | .................... | B60L 3/0046 |
| 2017/0365901 A1 * | 12/2017 | Hiramitsu | ......... | H01M 8/04932 |
| 2020/0340758 A1 * | 10/2020 | Fuse | ........................ | B60H 1/04 |
| 2021/0138868 A1 * | 5/2021 | Bruneau | ........... | H01M 10/6552 |
| 2021/0156296 A1 * | 5/2021 | Xi | ............................ | F01P 7/165 |
| 2021/0167442 A1 * | 6/2021 | Becker | .................... | B60L 58/24 |
| 2022/0041031 A1 * | 2/2022 | Huang | ..................... | B60L 58/27 |
| 2022/0134841 A1 * | 5/2022 | Jeong | ................. | B60H 1/32281 |
| | | | | 62/79 |
| 2022/0176774 A1 * | 6/2022 | Tang | .................. | B60H 1/00485 |
| 2022/0338392 A1 * | 10/2022 | Watanabe | ........ | H05K 7/20945 |
| 2022/0410653 A1 * | 12/2022 | Li | ...................... | B60H 1/00035 |
| 2023/0012558 A1 * | 1/2023 | Richardson | ........ | B60H 1/32281 |
| 2023/0226877 A1 | 7/2023 | Hu et al. | | |
| 2023/0344070 A1 * | 10/2023 | Kojc | ................... | H01M 10/658 |
| 2024/0116326 A1 | 4/2024 | Lin et al. | | |
| 2024/0217308 A1 * | 7/2024 | Zhao | .................. | B60H 1/00885 |
| 2024/0217394 A1 * | 7/2024 | Ono | ........................ | B60L 58/14 |
| 2024/0297360 A1 * | 9/2024 | Moon | .................. | H01M 10/637 |
| 2025/0105391 A1 * | 3/2025 | Tissot | ..................... | B60R 16/08 |

FOREIGN PATENT DOCUMENTS

| | | | | | |
|---|---|---|---|---|---|
| CN | 111403773 | A | * | 7/2020 | ........ H01M 8/04029 |
| CN | 112072201 | A | * | 12/2020 | .......... H01M 10/615 |
| CN | 112829630 | A | * | 5/2021 | ............ B60L 58/24 |
| CN | 113471572 | A | * | 10/2021 | .......... H01M 10/615 |
| CN | 115602978 | B | * | 10/2023 | .......... H01M 50/204 |
| CN | 117013140 | A | * | 11/2023 | .......... H01M 10/613 |
| CN | 117525673 | A | * | 2/2024 | .......... H01M 10/613 |
| CN | 118040159 | A | | 5/2024 | |
| CN | 118367290 | A | * | 7/2024 | .......... H01M 50/543 |
| CN | 118849711 | A | * | 10/2024 | ............. B60L 58/27 |
| DE | 102019130799 | A1 | * | 5/2021 | ............ H01M 10/48 |
| EP | 4344913 | A1 | * | 4/2024 | ............ B60K 11/02 |
| EP | 4378732 | A1 | | 6/2024 | |
| FR | 2976739 | A3 | * | 12/2012 | ........ H01M 10/6552 |
| WO | WO-2022176350 | A1 | * | 8/2022 | ............... B60K 1/04 |
| WO | WO-2024037100 | A1 | * | 2/2024 | .......... F02B 29/0406 |
| WO | 2024069608 | A1 | | 4/2024 | |

* cited by examiner

THERMAL MANAGEMENT SYSTEM AND THERMAL MANAGEMENT METHOD OF ELECTRIC MOTORCYCLE

CROSS-REFERENCE TO RELATED APPLICATIONS

This application claims priority to Chinese patent application No. 202411572974.7, filed on Nov. 5, 2024, and entitled "thermal management system and thermal management method of electric motorcycle", the entire contents of which is incorporated herein by reference.

TECHNICAL FIELD

The present application relates to the technical field of battery packs of electric motorcycles, and more particularly, to a thermal management system and a thermal management method of an electric motorcycle.

BACKGROUND

With the intensification of the global energy crisis and the increasing severity of environmental pollution problems, electric motorcycles, as clean and efficient transportation tools, have attracted widespread attention and are widely applied. In a thermal management system of an electric motorcycle, heat dissipation efficiencies of a battery pack and a motor of the electric motorcycle are key performance indicators that affect a safety, an endurance and a service life of the electric motorcycle.

Currently, most electric motorcycles mainly rely on natural cooling or air cooling to dissipate heat from battery packs and motors, however, a heat dissipation speed of natural cooling is extremely slow. Although the heat dissipation speed of air cooling is faster than that of natural cooling, currently, in order to improve the endurance and meet the needs of high-rate discharge, electric motorcycles have increased the number of battery cells, thereby sharply compressing a limited space of the battery pack of the electric motorcycle for active heat dissipation. Thus, the air cooling method cannot meet the heat dissipation requirement of the battery pack. Moreover, the air cooling method is only applicable during the driving process of the electric motorcycle. During the charging process of the electric motorcycle, since the electric motorcycle is in a stationary state, the heat of the battery pack cannot be taken away by airflow, the heat cannot be dissipated in time, battery failure is prone to occur, and the service life of the battery pack of the electric motorcycle may be shortened. Thermal runaway of the battery cell may also be caused, and a serious safety accident may occur accordingly. Therefore, there is an urgent need for a heat dissipation solution that can achieve excellent heat dissipation effect during the driving process and the charging processes of the electric motorcycle.

SUMMARY

An objective of the embodiments of the present application is providing a thermal management system and a thermal management method, which aim at solving a technical problem in the related art that a whole electric motorcycle has a bad heat dissipation effect due to the fact that a battery pack and a motor of the electric motorcycle has bad heat dissipation effects during a driving process and a charging process.

In order to achieve the above objective, the technical solutions adopted by the present application is: providing a thermal management system of an electric motorcycle, the thermal management system includes:

a battery housing configured to accommodate at least one battery module;

a motor housing configured to accommodate a motor;

a first liquid flow loop, where the first liquid flow loop flows through the battery module, and a part of structures in the first liquid flow loop are connected to the battery housing, a first control valve is provided in the first liquid flow loop, and the first control valve is configured to control a liquid flow state of the first liquid flow loop;

a second liquid flow loop including a liquid flow channel of the battery housing and a liquid flow channel of the motor housing, where the liquid flow channel of the battery housing is formed in the battery housing, the liquid flow channel of the motor housing is formed in the motor housing; a second control valve is provided in the liquid flow channel of the battery housing, and the second control valve is connected to the liquid flow channel of the battery housing and the liquid flow channel of the motor housing, respectively, the second control valve is configured to control a liquid flow state of the liquid flow channel of the battery housing and the liquid flow channel of the motor housing, respectively; and a thermal management controller having a signal connection with the first control valve and the second control valve, respectively. The thermal management controller may control the first control valve so as to control the liquid flow state of the first liquid flow loop. The thermal management controller may also control the second control valve so as to control the liquid flow state of the liquid flow channel of the battery housing and the liquid flow state of the liquid flow channel of the motor housing, respectively.

The thermal management system of the electric motorcycle provided in the present application has the following beneficial effects: as compared to the related art, in the thermal management system of the electric motorcycle of the present application, during the driving process of the electric motorcycle, the thermal management controller controls the first control valve so as to enable the liquid in the first liquid flow loop to flow. Thus, the heat of the battery module is transferred to the battery housing through the liquid in the first liquid flow loop. Since airflow passes through the battery housing during the driving process of the electric motorcycle, the heat on the battery housing is taken away by the airflow, and a heat dissipation efficiency of the battery module is improved. The thermal management controller controls the second control valve so as to enable the liquid in the liquid flow channel of the motor housing to flow, thereby dissipating the heat of the motor. In this way, a heat dissipation effect of the motor is improved. During a charging process of the electric motorcycle, since the motor is not in operation, there is no need to dissipate heat from the motor. In this condition, the thermal management controller controls the first control valve and the second control valve respectively to allow the liquid in the first liquid flow loop to flow and allow the liquid in the liquid flow channel of the battery housing to flow, the heat on the battery housing is taken away by the flow of the liquid in the liquid flow channel of the battery housing, the heat dissipation effect of the battery module may also be improved.

As described above, the thermal management system of the electric motorcycle provided in this embodiment of the present application may achieve an excellent heat dissipation effect on the battery module in the driving process and the charging process of the electric motorcycle, and may also achieve a better heat dissipation effect on the motor in the driving process of the electric motorcycle. Thus, the heat dissipation effect of the whole vehicle of the electric motorcycle is better.

In some embodiments, the first liquid flow loop includes a liquid flow channel of the battery module and a semiconductor component. The liquid flow channel of the battery module is formed in the battery module, the semiconductor component is connected with the battery housing, the semiconductor component is connected with the liquid flow channel of the battery module, the first control valve is connected with the liquid flow channel of the battery module or the semiconductor component. The semiconductor component has a signal connection with the thermal management controller, and the thermal management controller is configured to control the semiconductor component to heat or cool the liquid flow channel of the battery module.

In some embodiments, the battery housing has a mounting area, one side of the mounting area is connected to the semiconductor component, and the liquid flow channel of the battery housing is formed on an opposite side of the mounting area.

In some embodiments, a plurality of spoiler columns are arranged at intervals in the liquid flow channel of the battery housing.

In some embodiments, the plurality of spoiler columns are arranged on a first inner wall of the liquid flow channel of the battery housing, and a projection shape of the plurality of spoiler columns on the first inner wall is a water drop shape.

In some embodiments, the semiconductor component is mounted on an inner surface of the mounting area, an outer surface of the mounting area is covered with a cover body, the cover body and the outer surface of the mounting area are enclosed to form the liquid flow channel of the battery housing, and the plurality of the spoiler columns are arranged at intervals on the outer surface of the mounting area.

In some embodiments, the outer surface of the cover body is provided with heat dissipation teeth.

In some embodiments, each of multiple side walls of the battery housing is provided with the mounting area, one side of each mounting area is connected to the semiconductor component, and the liquid flow channel of the battery housing is formed on an opposite side of the mounting area.

In some embodiments, the battery module includes a liquid cooler, a battery cell holder and a battery cell, the liquid cooler and the battery cell holder are enclosed to form an accommodation space, a plurality of the battery cells are accommodated in the accommodation space, and the liquid cooler is provided with the liquid flow channel of the battery module.

In some embodiments, the accommodation space is filled with a thermal conducting adhesive, and the thermal conducting adhesive is provided between the battery cell and the liquid cooler and between two adjacent battery cells.

In some embodiments, a plurality of first heat pipes are arranged at intervals in the accommodation space. Each of the plurality of first heat pipes includes two first heat absorption ends and one first heat releasing end, one of the two first heat absorption ends is arranged in a gap between two adjacent battery cells, the first heat releasing end of each of the plurality of first heat pipes is connected to the liquid cooler, and the plurality of first heat pipes are buried in the thermal conducting adhesive.

In some embodiments, the first heat pipe is a U-shaped pipe, the U-shaped pipe is provided with two extension parts and one middle part between the two extension parts, the middle part is connected to the two extension parts, respectively. The two extension parts are the two first heat absorption ends, and the middle part is the first heat releasing end.

In some embodiments, the plurality of battery cells are connected to the battery cell holder, the thermal conducting adhesive is arranged to be spaced from the battery cell holder, and a thermal insulating adhesive is filled in a space between the thermal conducting adhesive and the battery cell holder.

In some embodiments, a plurality of the battery modules are accommodated in the battery housing, liquid flow channels of the battery modules in the liquid coolers of the plurality of battery modules are connected in parallel, and the plurality of liquid flow channels of the battery modules are connected with the semiconductor component.

In some embodiments, the first liquid flow loop further includes a first water tank cooling module. A water outlet of the first water tank cooling module is connected to a first water inlet of the first control valve, a water outlet of the first control valve is connected to a water inlet of the semiconductor component, a water outlet of the semiconductor component is connected to a water inlet of the liquid flow channel of the battery module, and a water outlet of the liquid flow channel of the battery module is respectively connected to a water inlet of the first water tank cooling module and a second water inlet of the first control valve.

In some embodiments, the second liquid flow loop further includes a second water tank cooling module. A water outlet of the second water tank cooling module is connected to a water inlet of the second control valve, a first water outlet of the second control valve is connected to a water inlet of the liquid flow channel of the motor housing, a second water outlet of the second control valve is connected to the water inlet of the liquid flow channel of the battery housing, and water outlets of the liquid flow channel of the motor housing and the liquid flow channel of the battery housing are connected to a water inlet of the second water tank cooling module.

In some embodiments, the thermal management controller is arranged on a windward side of the battery housing; and/or,
an outer surface of the thermal management controller is provided with heat dissipation teeth.

A thermal management method of an electric motorcycle is further provided in the present application. The thermal management method is applicable to the thermal management system of the electric motorcycle provided by any one of the technical solutions. The thermal management method includes:
  determining an operating condition of the thermal management system, where the operating condition includes a charging condition and a discharge condition;
  obtaining a temperature value of the battery module, and comparing the temperature value of the battery module with a preset charging temperature threshold or a preset discharge temperature threshold;
  in the charging condition, controlling the first control valve through the thermal management controller so as to allow liquid in the first liquid flow loop to flow therethrough, or controlling the first control valve and the second control valve respectively through the thermal management controller so as to allow the liquid in the first liquid flow loop to flow therethrough and allow liquid in the liquid flow channel of the battery housing to flow therethrough, according to a result of comparison between a temperature value of the battery module and the preset charging temperature threshold; and in the discharge condition, controlling the first control valve and the second control valve respectively through the thermal management controller so as to allow the liquid in the first liquid flow loop to flow therethrough and allow the liquid in the liquid flow channel of the motor housing to flow therethrough, according to a result of comparison between the temperature value of the battery module and the preset discharge temperature threshold.

The thermal management method of the electric motorcycle provided in the present application has the following beneficial effects: as compared to the related art, according to the thermal management method of the electric motorcycle in the present application, it is possible to selectively control the first control valve alone or separately control the first control valve and the second control valve according to the temperature of the battery module through the thermal management controller in the charging condition (i.e., during the charging process of the electric motorcycle), so as to adjust the heat dissipation effect of the battery module. When the temperature of the battery module is relatively lower or slightly higher, the thermal management controller may control the first control valve to allow the liquid in the first liquid flow loop to flow so as to preserve the heat of the battery module or dissipate the heat of the battery module preliminarily. When the temperature of the battery module is higher, the thermal management controller may control the first control valve and the second control valve separately to improve the heat dissipation effect of the battery module.

In the discharge condition (i.e., during the driving process of the electric motorcycle), the thermal management controller may control the first control valve and the second control valve according to the temperature of the battery module, to enable the liquid in the first liquid flow loop to flow so as to preserve the heat of the battery module or dissipate the heat. Moreover, the liquid in the liquid flow channel of the motor housing in the second liquid flow loop dissipates heat of the motor. Since there is airflow passing through the battery housing during the driving process of the electric motorcycle, the heat dissipation rate of the battery module may also be increased even if liquid does not flow in the liquid flow channel of the battery housing.

In conclusion, the thermal management method of the electric motorcycle provided in this embodiment of the present application may achieve excellent heat dissipation effect on the battery module during the driving process and the charging process of the electric motorcycle, and may also achieve an excellent heat dissipation effect on the motor during the driving process of the electric motorcycle. Thus, the whole electric motorcycle has a better heat dissipation effect.

In some embodiments, the first liquid flow loop includes a liquid flow channel of the battery module, a semiconductor component and a first water tank cooling module. A water outlet of the first water tank cooling module is connected to a first water inlet of the first control valve, a water outlet of the first control valve is connected to a water inlet of the semiconductor component, a water outlet of the semiconductor component is connected to a water inlet of the liquid flow channel of the battery module, and a water outlet of the liquid flow channel of the battery module is respectively connected to a water inlet of the first water tank cooling module and a second water inlet of the first control valve.

The preset charging temperature threshold includes a charging low temperature threshold, a first charging temperature threshold, a second charging temperature threshold and a third charging temperature threshold. The preset discharge temperature threshold includes a discharge low temperature threshold, a first discharge temperature threshold, a second discharge temperature threshold and a third discharge temperature threshold.

Controlling the first control valve through the thermal management controller according to the result of comparison between the temperature value of the battery module and the preset charging temperature threshold or the preset discharge temperature threshold includes:

controlling, by the thermal management controller, the second water inlet of the first control valve to be connected to the water outlet of the first control valve, and controlling the semiconductor component to heat the liquid in the liquid flow channel of the battery module, when the temperature value of the battery module is lower than the charging low temperature threshold or is lower than the discharge low temperature threshold;

controlling, by the thermal management controller, the second water inlet of the first control valve to be connected to the water outlet of the first control valve, and controlling the semiconductor component to stop heating, when the temperature value of the battery module is higher than the charging low temperature threshold and is lower than the first charging temperature threshold, or when the temperature value of the battery module is higher than the discharging low temperature threshold and is lower than the first discharge temperature threshold;

controlling, by the thermal management controller, the first water inlet of the first control valve to be connected to the water outlet of the first control valve, when the temperature value of the battery module is higher than the first charging temperature threshold and is lower than the second charging temperature threshold, or when the temperature value of the battery module is higher than the first discharge temperature threshold and is lower than the second discharge temperature threshold; and controlling, by the thermal management controller, the first water inlet of the first control valve to be connected to the water outlet of the first control valve, and controlling the semiconductor component to cool the liquid in the liquid flow channel of the battery module, when the temperature value of the battery module is higher than the second charging temperature threshold and is lower than the third charging temperature threshold, or when the temperature value of the battery module is higher than the second discharge temperature threshold and is lower than the third discharge temperature threshold.

In some embodiments, the preset charging temperature threshold further includes a fourth charging temperature threshold; the thermal management method further includes: in the charging condition, controlling, by the thermal management controller, the first water inlet of the first control valve to be connected to the water outlet of the first control valve, and controlling the semiconductor component to cool the liquid in the liquid flow channel of the battery module, when the temperature value of the battery module is higher than the third charging temperature threshold and is lower than the fourth charging temperature threshold; and controlling, by the thermal management controller, the second control valve so as to allow the liquid in the liquid flow channel of the battery housing to flow therethrough.

In some embodiments, the method further includes: in the charging condition, reducing a charging power of the battery module or controlling the battery module to stop charging when the temperature value of the battery module is higher than the fourth charging temperature threshold; and in the discharge condition, reducing a discharge power of the battery module or controlling the battery module to stop discharging when the temperature value of the battery module is higher than the third discharge temperature threshold.

DESCRIPTION OF THE DRAWINGS

In order to describe the technical solutions in the embodiments of the present application more clearly, a brief introduction regarding the accompanying drawings that need to be used for describing the embodiments or the existing technologies is given below. It is obvious that the accompanying drawings described below are merely some embodiments of the present application, a person of ordinary skill in the art may also obtain other drawings according to the current drawings without paying creative works.

Figure 1:
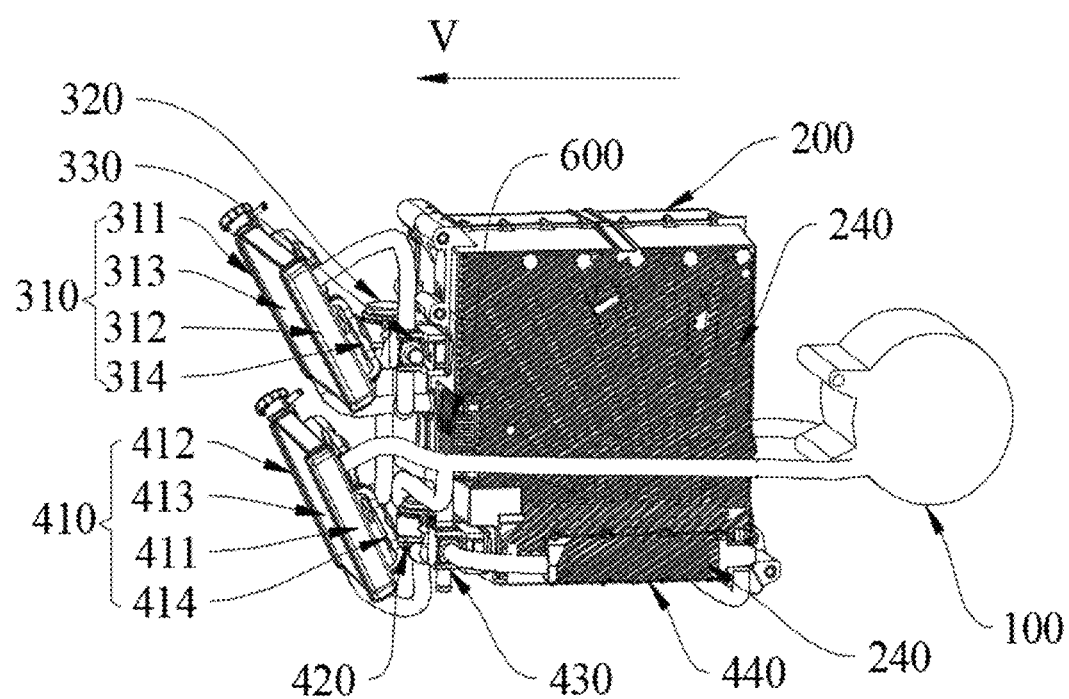
FIG. 1 illustrates a schematic structural diagram of a thermal management system of an electric motorcycle in accordance with one embodiment of the present application.

Reference numerals involved in the accompanying figures are listed below:

100—motor housing;

200—battery housing; 210—first half shell; 220—second half shell; 230—second heat pipe; 231—first short pipe; 232—second short pipe; 240—heat dissipation teeth;

310—first water tank cooling module; 311—first water inlet tank; 312—first water outlet tank; 313—first radiator; 314—first cooling fan; 320—first water pump; 330—first control valve; 340—semiconductor component; 342—semiconductor chilling plate; 343—heat exchange structure; 3431—heat-cold exchange liquid flow channel;

410—second water tank cooling module; 411—second water inlet tank; 412—second water outlet tank; 413—second radiator; 414—second cooling fan; 420—second water pump; 430—second control valve; 440—cover body; 450—spoiler column; 460—liquid flow channel of battery housing;

500—battery module; 510—battery cell holder; 520—liquid cooler; 521—liquid cooling plate; 5211—mounting groove; 5212—liquid flow channel of battery module; 522—liquid cooling plate holder; 530—thermal conducting adhesive; 540—thermal insulating adhesive; 550—first heat pipe; 560—battery cell; 571—total water inlet pipe; 572—total water outlet pipe;

600—thermal management controller.

DETAILED DESCRIPTION

In order to make the technical problems, the technical solutions and the beneficial effects of the present application be clearer and more understandable, the present application will be further described in detail below with reference to the accompanying figures and the embodiments. It should be understood that the embodiments described herein are only intended to illustrate the present application, rather than limiting the present application.

It is worth noting that, when describing that one component is "fixed to" or "arranged on" another component, this component may be directly or indirectly arranged on another component. When describing that one component "is connected with" another component, this component may be directly or indirectly connected to the another component.

It needs to be understood that, directions or location relationships indicated by terms such as "length", "width", "up", "down", "front", "rear", "left", "right", "vertical", "horizontal", "top", "bottom", "inside", "outside", and so on are the directions or location relationships shown in the accompanying figures, which are only for the purpose of describing the present application conveniently and simplifying the description of the present application, rather than being intended to indicate or imply that an indicated device or component must have specific locations or be constructed and manipulated according to specific locations. Thus, these terms shouldn't be interpreted as limitations to the present application.

In addition, terms such as "the first" and "the second" are only for the purpose of illustration, rather than being interpreted as indicating or implying any relative importance, or implicitly indicating the number of indicated technical features. Thus, technical feature(s) restricted by "the first" or "the second" can explicitly or implicitly comprise one or more such technical feature(s). In the description of the present application, the term "a plurality of" indicates a number of at least two, unless otherwise the term "a plurality of" is explicitly and specifically defined.

In order to illustrate the technical solutions in the present application, the technical solutions of the present application are described in detail below with reference to the accompanying figures and the embodiments.

As shown in FIGS. 1-16, a thermal management system for an electric motorcycle is provided in one embodiment of the present application. The thermal management system includes a battery housing 200, a motor housing 100, a first liquid flow loop, a second liquid flow loop and a thermal management controller (which is also referred to as a thermal management unit with a full English name of Thermal Management Unit, abbreviated in English as TMU) 600. A battery module 500 is accommodated in the battery housing 200, and the motor housing 100 is used to accommodate a motor. The first liquid flow loop flows through the battery module 500, and a part of structures in the first liquid flow loop are connected to the battery housing 200. A first control valve 330 is provided in the first liquid flow loop, and the first control valve 330 is used to control a liquid flow state of the first liquid flow loop. The second liquid flow loop includes a liquid flow channel 460 of the battery housing and a liquid flow channel of the motor housing 100. The liquid flow channel 460 of the battery housing is formed in the battery housing 200, and the liquid flow channel of the motor housing 100 is formed in the motor housing 100. A second control valve 430 is provided in the second liquid flow loop. The second control valve 430 is connected to the liquid flow channel 460 of the battery housing and the liquid flow channel of the motor housing 100, respectively. The second control valve 430 is used to control the liquid flow state of the liquid flow channel 460 of the battery housing and the liquid flow channel of the motor housing 100, respectively. The thermal management controller 600 has a signal connection with the first control valve 330 and the second control valve 430, respectively. The thermal management controller 600 may control the liquid flow state of the first liquid flow loop by controlling the first control valve 330. The thermal management controller 600 may also respectively control the liquid flow state of the liquid flow channel 460 of the battery housing and the liquid flow state of the liquid flow channel of the motor housing 100 by controlling the second control valve 430.

The thermal management system of the electric motorcycle ("thermal management system of electric motorcycle" is abbreviated as "thermal management system" hereinafter) provided in the embodiment of the present application may be applied to the electric motorcycle. When the thermal management system is applied to the electric motorcycle, during the driving process of the electric motorcycle, the thermal management controller 600 controls the first control valve 330 so as to enable the liquid in the first liquid flow loop to flow. Thus, the heat of the battery module 500 is transferred to the battery housing 200 through the liquid in the first liquid flow loop. Since airflow passes through the battery housing 200 during the driving process of the electric motorcycle, the heat on the battery housing 200 is taken away by the airflow, and a heat dissipation efficiency of the battery module 500 is improved. The thermal management controller 600 controls the second control valve 430 so as to enable the liquid in the liquid flow channel of the motor housing 100 to flow, thereby dissipating the heat of the motor. In this way, a heat dissipation effect of the motor is improved. During a charging process of the electric motorcycle, since the motor is not in operation, there is no need to dissipate heat from the motor. In this condition, the thermal management controller 600 controls the first control valve 330 and the second control valve 430 respectively to allow the liquid in the first liquid flow loop to flow and allow the liquid in the liquid flow channel 460 of the battery housing to flow, the heat on the battery housing 200 is taken away by the flow of the liquid in the liquid flow channel 460 of the battery housing, the heat dissipation effect of the battery module 500 may also be improved.

As described above, the thermal management system of the electric motorcycle provided in this embodiment of the present application may achieve an excellent heat dissipation effect on the battery module 500 in the driving process and the charging process of the electric motorcycle, and may also achieve a better heat dissipation effect on the motor in the driving process of the electric motorcycle. Thus, the heat dissipation effect of the whole vehicle of the electric motorcycle is better.

The thermal management system provided in this embodiment of the present application may be used as a power source for the electric motorcycle, the battery module 500 in the thermal management system may provide continuous and stable electric energy to the motor of the electric motorcycle, thereby driving the electric motorcycle to be operated. In some application scenarios, the electric motorcycle may be a high-speed electric motorcycle or a mountain off-road electric motorcycle. Alternatively, the electric motorcycle may also be an all-terrain vehicle, such as an all terrain vehicle (All Terrain Vehicle, ATV) or a utility all-terrain vehicle (Utility All-Terrain Vehicle, UTV), etc.

Figure 2:
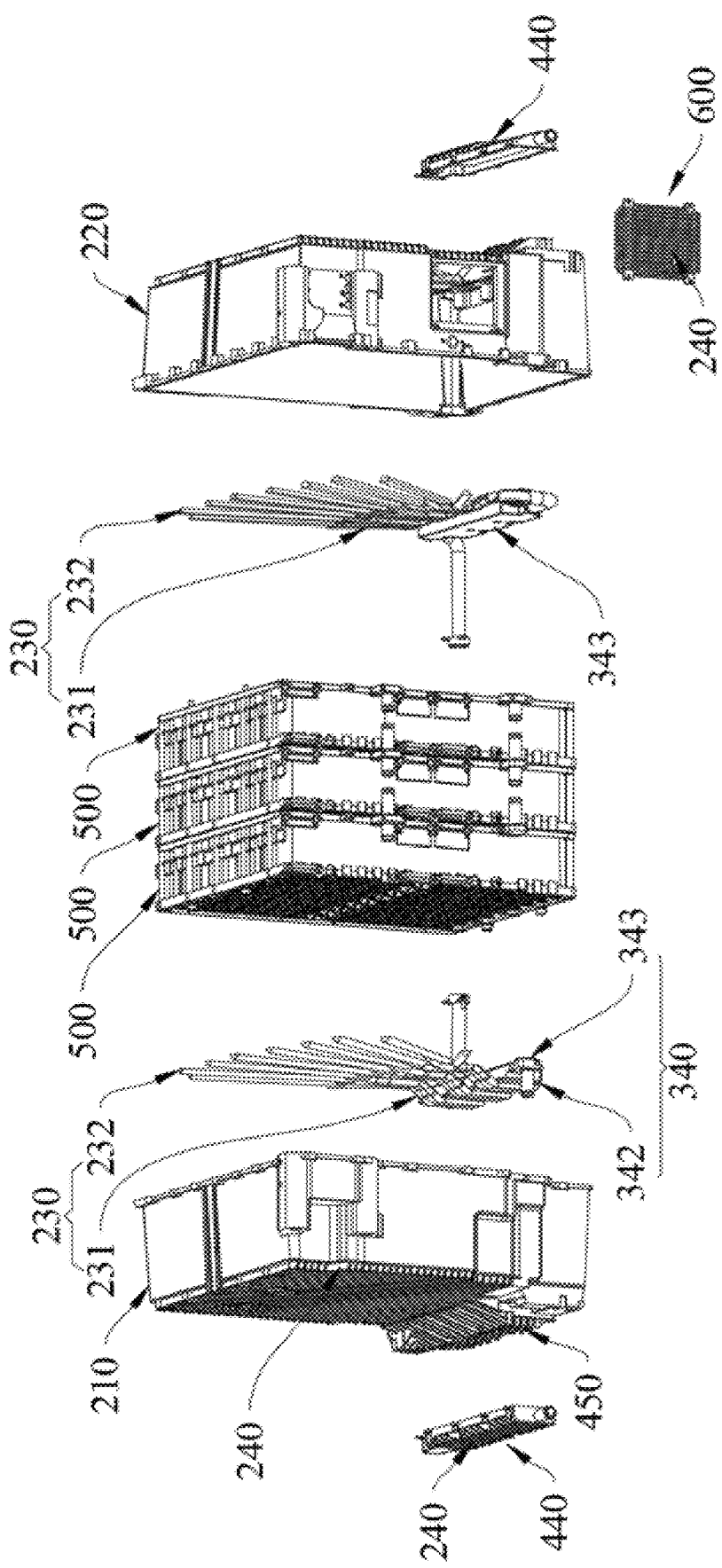
FIG. 2 illustrates a schematic exploded diagram of components of the thermal management system of the electric motorcycle in accordance with one embodiment of the present application.
Figure 3:
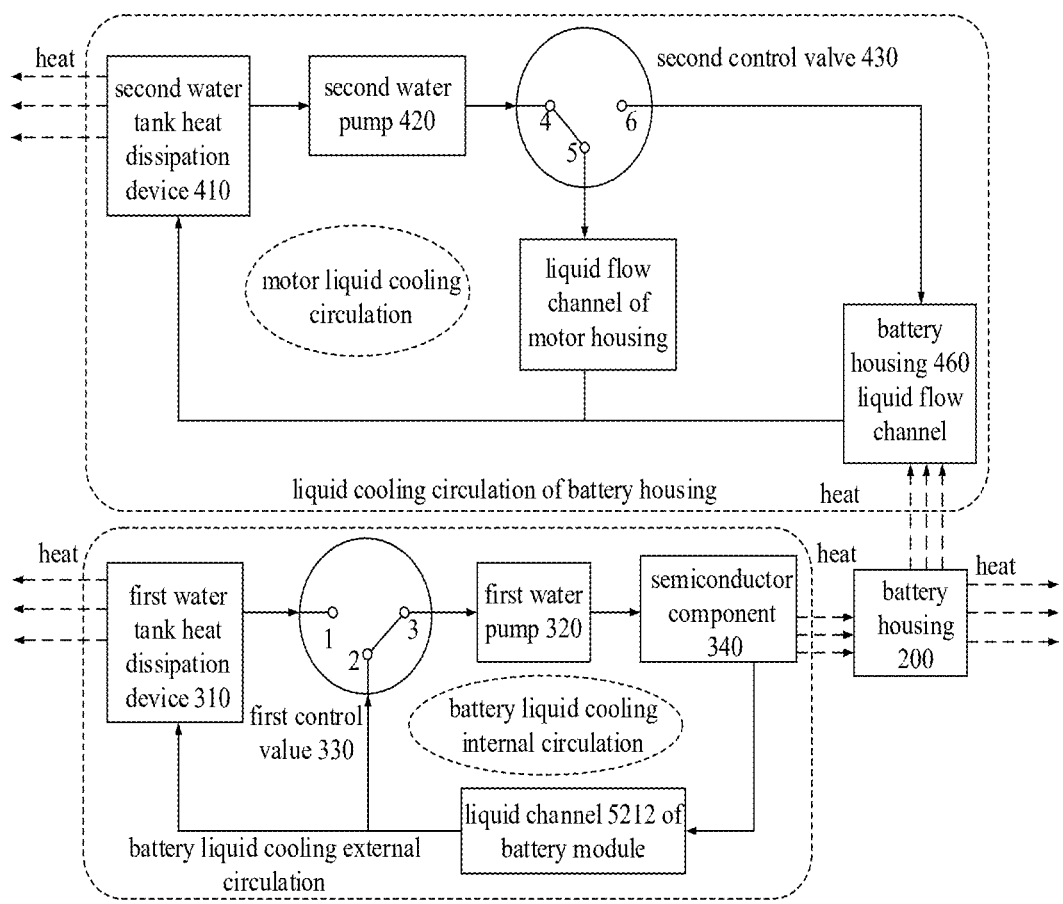
FIG. 3 illustrates a schematic diagram of a connection relationship between a first liquid flow loop and a second liquid flow loop in the thermal management system of the electric motorcycle in accordance with one embodiment of the present application.

In some embodiments, as shown in FIGS. 1-3, the first liquid flow loop includes a liquid flow channel 5212 of the battery module and a semiconductor component 340, the liquid flow channel 5212 of the battery module is formed in the battery module 500, the semiconductor component 340 is connected with the battery housing 200, the semiconductor component 340 is connected with the liquid flow channel

5212 of the battery module, the first control valve 330 is connected with the liquid flow channel 5212 of the battery module or the semiconductor component 340, the semiconductor component 340 has a signal connection with the thermal management controller 600. The thermal management controller 600 is used to control the semiconductor component 340 to heat or cool the liquid flow channel 5212 of the battery module. Since both high and low temperature environments will affect the service life and the operational performance of the battery module 500, the semiconductor component 340 is provided to heat or cool the liquid flow channel 5212 of the battery module under the control of the thermal management controller 600. Thus, the battery module 500 may be heated or cooled, and the battery module 500 may be maintained at a suitable temperature regardless of whether it is operated in a high temperature or in a low temperature environment, the service life of the battery module 500 is prolonged and the operational performance of the battery module 500 is improved accordingly.

Figure 4:
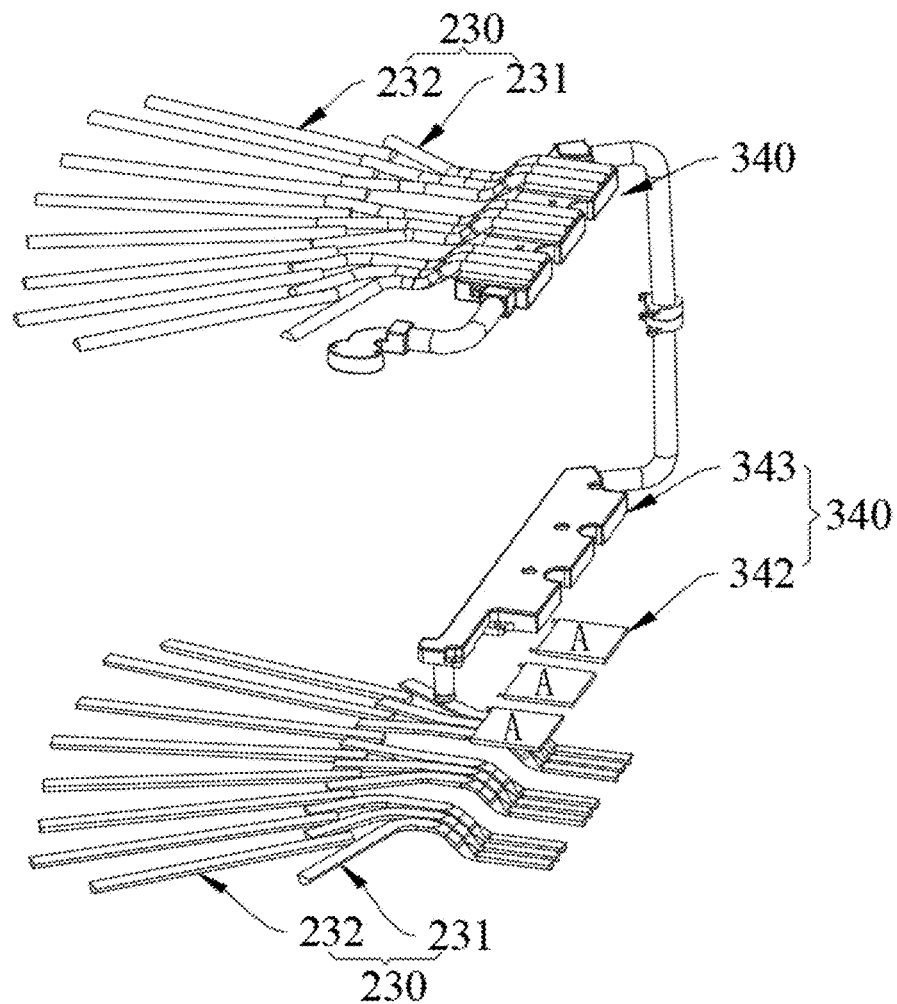
FIG. 4 illustrates a schematic structural diagram of two semiconductor components and multiple second heat pipes in the thermal management system of the electric motorcycle in accordance with one embodiment of the present application.
Figure 5:
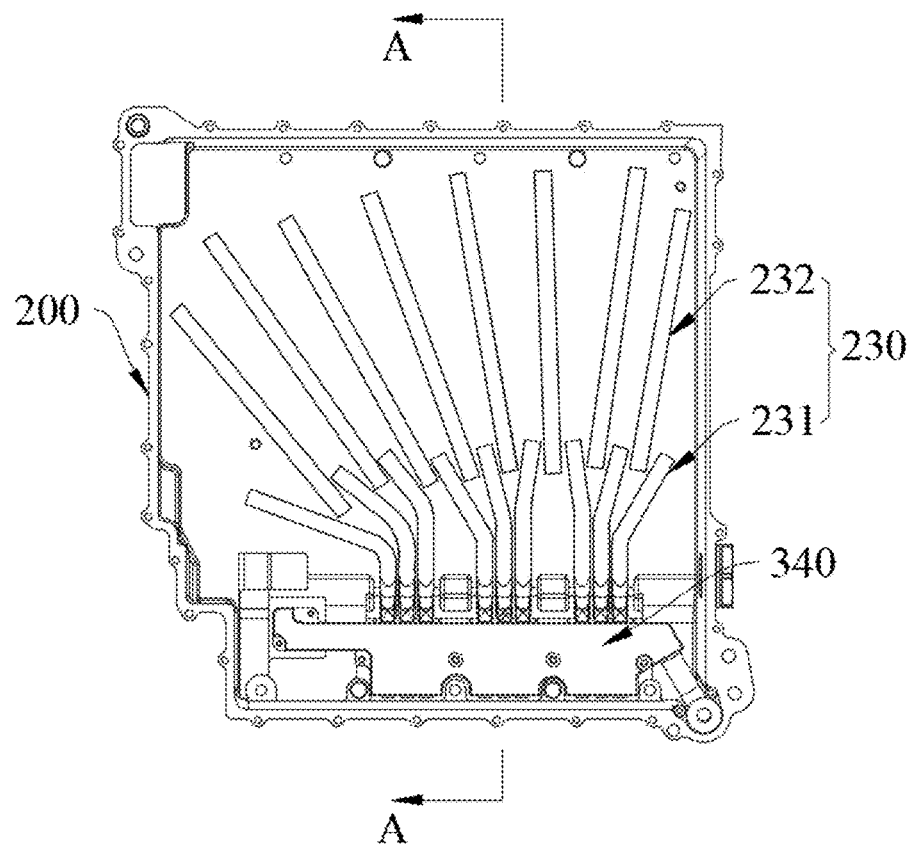
FIG. 5 illustrates a schematic diagram of an assembly of semiconductor components, the second heat pipes and the battery housing in the thermal management system of the electric motorcycle in accordance with one embodiment of the present application.

Optionally, a second heat pipe 230 is mounted on a side wall of the battery housing 200. The second heat pipe 230 may either be an integrated heat pipe or be a segmented heat pipe. For example, the second heat pipe 230 is a segmented heat pipe, as shown in FIG. 4 and FIG. 5, the second heat pipe 230 includes a first short pipe 231 and a second short pipe 232, both the first short pipe 231 and the second short pipe 232 are mounted on the battery housing 200. The first short pipe 231 and the second short pipe 232 are arranged to be spaced apart from each other, and a heat absorbing end of the first short pipe 231 is connected to the semiconductor component 340, a heat releasing end of the first short pipe 231 extends in a direction adjacent to the heat absorbing end of the second short pipe 232, and a heat releasing end of the second short pipe 232 extends in a direction away from the first short pipe 231. Optionally, both the first short pipe 231 and the second short pipe 232 are mounted on the side wall of the battery housing 200 by riveting. The parts of the first short pipe 231 and the second short pipe 232 that are pressed into the side wall of the battery housing 200 are both flat structures, which is conducive to reducing a wall thickness of the battery housing 200 and reducing the impact on the uniformity of the wall thickness of the battery housing 200. Due to this arrangement, some of the heat generated by the battery module 500 is transferred by the liquid in the liquid flow channel 5212 of the battery module to the heat-cold exchange flow channel 3431, in order to transfer the heat to the semiconductor component 340. The semiconductor component 340 transfers the heat to the first short pipe 231, and then transfers the heat to the battery housing 200 through the first short pipe 231. Some of the heat may be quickly dissipated to the outside through the area near the heat releasing end of the first short pipe 231 in the battery housing 200, and the rest part of the heat may be transferred to the second short pipe 232 through the battery housing 200, and then is quickly transferred to the heat releasing end of the second short pipe 232 through the second short pipe 232, and is quickly dissipated to the outside through the area adjacent to the heat releasing end of the second short pipe 232 in the battery housing 200. In this way, the heat of the semiconductor component 340 may be dissipated to multiple different areas of the battery housing 200 to increase the heat dissipation area of the battery housing 200 and improve the heat dissipation effect. Optionally, a plurality of second heat pipes 230 are provided, and the plurality of second heat pipes 230 are mounted at intervals in the battery housing 200, which is conducive to further improving the heat dissipation effect.

Figure 6:
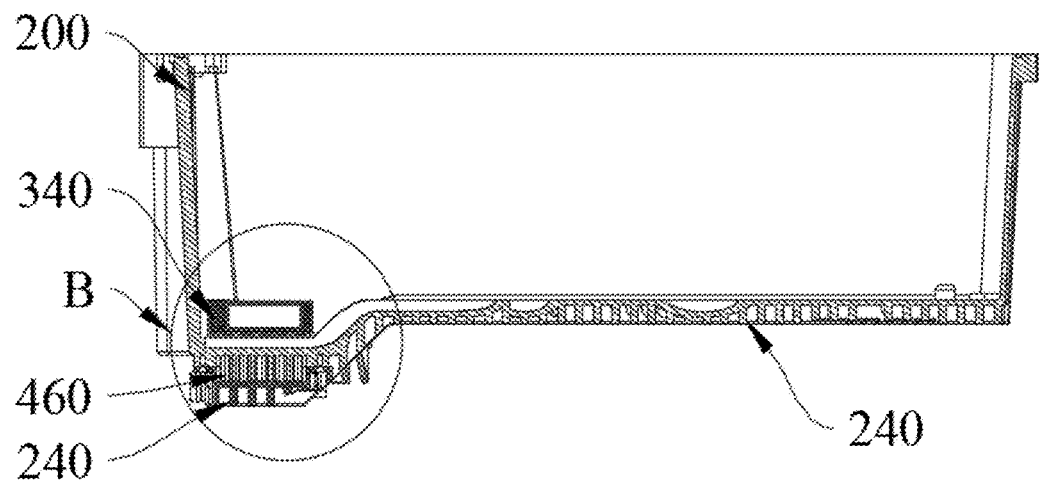
FIG. 6 illustrates a schematic cross-sectional view of a structure shown in FIG. 5 along A-A direction.
Figure 7:
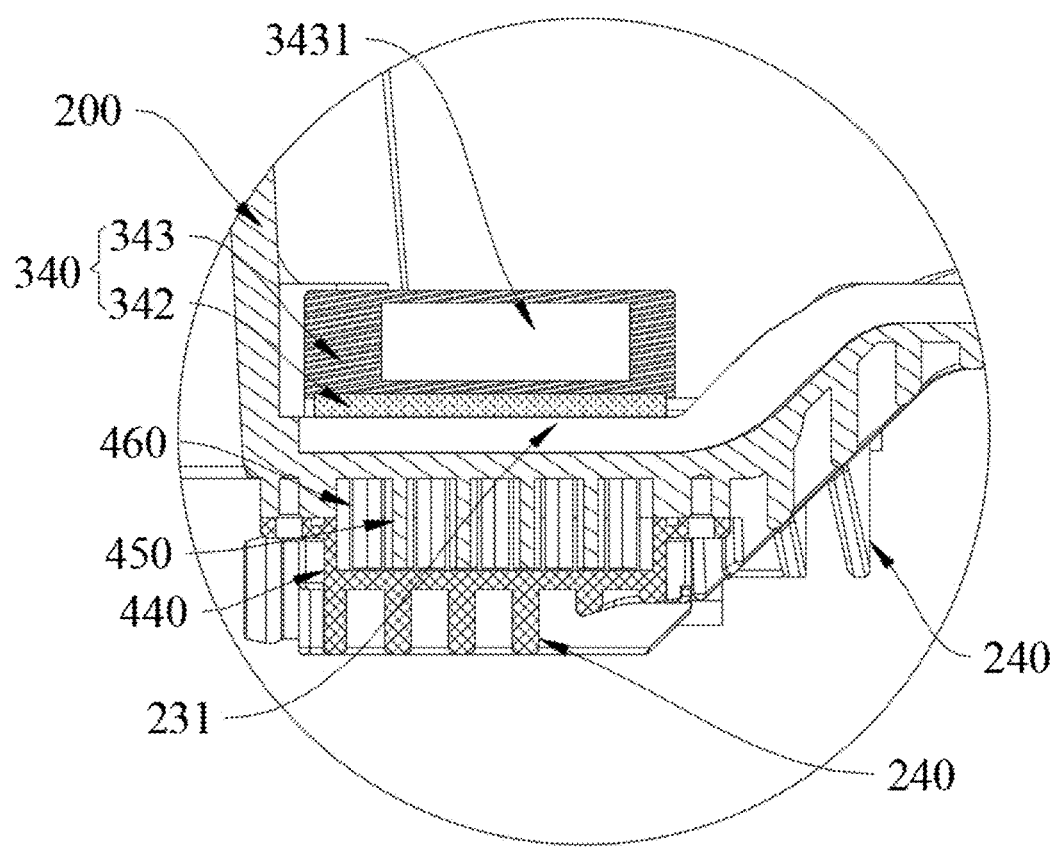
FIG. 7 illustrates a schematic enlarged partial view of B in FIG. 6.

Optionally, the semiconductor component 340 is specifically a module having heating and cooling functions. In one exemplary embodiment, as shown in FIGS. 4 and 5, the semiconductor component 340 may include a semiconductor chilling plate 342, the semiconductor chilling plate 342 has a signal connection with the thermal management controller 600. The thermal management controller 600 may control cooling and heating functions of the semiconductor chilling plate 342 by controlling a direction of the current passed into the semiconductor chilling plate 342. Optionally, the semiconductor assembly 340 further includes a heat-exchanging structure 343, the heat-exchanging structure 343 may be plate-shaped structures, columnar structures or structures having any other shape. As shown in FIGS. 5-7, and a heat-cold exchange liquid flow channel 3431 is provided in the heat-exchanging structure 343, and the heat-cold exchange liquid flow channel 3431 is connected with the liquid flow channel 5212 of the battery module. The semiconductor chilling plate 342 is arranged between the heat-exchanging structure 343 and the first short pipe 231, the semiconductor chilling plate 342 has a surface A and surface B (not shown in the figures) which are opposite to each other, the surface A of the semiconductor chilling plate 342 is attached to the heat-exchanging structure 343, and the surface B of the semiconductor chilling plate 342 is attached to the first short pipe 231. When a forward current flows through the semiconductor chilling plate 342, the surface A is a cooling surface, and the B surface is a heating surface. Some heat generated by the battery module 500 is transferred to the heat-cold exchange liquid flow channel 3431 by the liquid in the liquid flow channel 5212 of the battery module, in this way, the heat is transferred to the semiconductor chilling plate 342. In one aspect, the heat is transferred to the first short pipe 231 through the semiconductor chilling plate 342, and the heat is transferred to various areas of the battery housing 200 through the first short pipe 231 and the second short pipe 232, and is finally dissipated to the outside through the battery housing 200. In another aspect, the liquid in the heat-cold exchange liquid flow channel 3431 is cooled by the surface A of the semiconductor chilling plate 342, cooling of the liquid in the liquid flow channel 5212 of the battery module is achieved accordingly, and thus the heat dissipation effect for the battery module 500 is improved. Optionally, the surface A of the semiconductor chilling plate 342 is attached to the heat exchange structure 343 through thermal conductive paste, and the surface B of the semiconductor chilling plate 342 is attached to the first short pipe 231 through thermal conductive paste. Optionally, the semiconductor assembly 340 may include a plurality of semiconductor refrigeration sheets 342. The plurality of semiconductor refrigeration sheets 342 are electrically connected in sequence, and all surfaces A of the plurality of semiconductor refrigeration sheets 342 are attached to the heat exchange structures 343, and surfaces B of the plurality of semiconductor refrigeration sheets 342 are connected to the plurality of first short pipes 231. When a reverse current flows through the semiconductor chilling plate 342, the surface A is converted into a heating surface so as to heat the liquid in the heat-cold exchange liquid flow channel 3431. When the liquid in the heat-cold exchange liquid flow channel 3431 flows through the liquid flow channel 5212 of the battery module, the heat may be transferred to the battery module 500, and the battery module 500 is heated accordingly.

In some embodiments, the first control valve 330 and the second control valve 430 are both three-way valves. The first control valve 330 has a water outlet and two water inlets, and the two water inlets of the first control valve 330 are the first water inlet and the second water inlet, respectively. The second control valve 430 has one water inlet and two water outlets, and the two water outlets of the second control valve 430 are the first water outlet and the second water outlet, respectively.

In some embodiments, as shown in FIGS. 1-3, the first liquid flow loop further includes a first water tank cooling module 310, a water outlet of the first water tank cooling module 310 is connected to the first water inlet of the first control valve 330, the water outlet of the first control valve 330 is connected to the water inlet of the semiconductor component 340, the water outlet of the semiconductor component 340 is connected to the water inlet of the liquid flow channel 5212 of the battery module, and the water outlet of the liquid flow channel 5212 of the battery module is connected to the water inlet of the first water tank cooling module 310 and the second water inlet of the first control valve 330, respectively.

Due to this arrangement, the first water tank cooling module 310, the first control valve 330, the semiconductor component 340 and the liquid flow channel 5212 of the battery module form a battery liquid cooling external circulation. When the thermal management controller 600 controls the first water inlet of the first control valve 330 to be connected with the water outlet of the first control valve 330 (port 1 and port 3 of the first control valve 330 shown in FIG. 3 are connected), the liquid flows from the first water tank cooling module 310, and passes through the first control valve 330, the semiconductor component 340 and the liquid flow channel 5212 of the battery module in sequence, and finally returns to the first water tank cooling module 310 to form a circulation loop. In the battery liquid cooling external circulation, the heat generated by the battery module 500 is first transferred to the first water tank cooling module 310 for preliminary heat dissipation through the liquid in the liquid flow channel 5212 of the battery module; then, the liquid flows to the heat-cold exchange liquid flow channel 3431 in the semiconductor component 340, thus, some of the heat is transferred to the battery housing 200 through the semiconductor component 340. When external air flow passes through the battery housing 200, the heat on the battery housing 200 is taken away to achieve a further heat dissipation effect. In addition, the semiconductor component 340 may be controlled by the thermal management controller 600 to cool the liquid in the liquid flow channel 5212 of the battery module to achieve a further heat dissipation effect. The first control valve 330, the semiconductor component 340 and the liquid flow channel 5212 of the battery module form a battery liquid cooling internal circulation. When the thermal management controller 600 controls the second water inlet of the first control valve 330 to be connected with the water outlet of the first control valve 330 (port 2 and port 3 of the first control valve 330 shown in FIG. 3 are connected), the liquid flows circularly among the first control valve 330, the semiconductor component 340 and the liquid flow channel 5212 of the battery module. When the thermal management controller 600 controls the semiconductor component 340 to heat the liquid in the liquid flow channel 5212 of the battery module, the battery module 500 may be heated. When the thermal management controller 600 controls the semiconductor component 340 to cool the liquid in the liquid flow channel 5212 of the battery module, the battery module 500 may be cooled.

Optionally, a first water pump 320 is provided between the first control valve 330 and the semiconductor component 340, and the first water pump 320 is configured to drive the liquid to flow in the first liquid flow loop. Specifically, the water outlet of the first control valve 330 is specifically connected to the water inlet of the semiconductor component 340 through the first water pump 320. That is, the water outlet of first control valve 330 is connected to a water inlet of the first water pump 320, and a water outlet of the first water pump 320 is connected to the water inlet of the semiconductor component 340.

In one specific embodiment, the first water tank cooling module 310 includes a first water inlet tank 311, a first water outlet tank 312, and a first radiator 313. A first connecting channel is formed in the first radiator 313. A water inlet of the first water tank cooling module 310 is formed in the first water inlet tank 311, and a water outlet of the first water tank cooling module 310 is formed in the first water outlet tank 312. The first water inlet tank 311 and the first water outlet tank 312 are located on opposite sides of the first radiator 313, and are connected through the first connecting channel in the first radiator 313. In this embodiment, the liquid in the flow channel 5212 of the battery module flows into the first water inlet tank 311 from the water inlet of the first water inlet tank 311 (i.e., the water inlet of the first water tank cooling module 310), and then flows into the first connecting channel of the first heat sink 313 which cools the liquid flowing through the first communicating channel of the first heat sink 313. Afterwards, the liquid flows into the first water outlet tank 312 and flows from the water outlet of the first water outlet tank 312 (i.e., the water outlet of the first water tank cooling module 310) to the first control valve 330. When the first water inlet of the first control valve 330 is connected to the water outlet of the first control valve 330 (port 1 and port 3 of the first control valve 330 in FIG. 3 are connected), the liquid may flow from the first control valve 330 to the heat-cold exchange liquid flow channel 3431 in the semiconductor component 340, and finally flow back to the liquid flow channel 5212 of the battery module. Due to this arrangement, water is reserved in the first water inlet tank 311 and the first water outlet tank 312, and heat is dissipated through the first radiator 313. Thus, the first water tank cooling module 310 has both water storage and cooling functions, the structural complexity of the thermal management system is reduced.

In some embodiments, as shown in FIGS. 1-3, the second liquid flow loop further includes a second water tank cooling module 410, a water outlet of the second water tank cooling module 410 is connected to the water inlet of the second control valve 430, the first water outlet of the second control valve 430 is connected to the water inlet of the liquid flow channel of the motor housing 100, the second water outlet of the second control valve 430 is connected to the water inlet of the liquid flow channel 460 of the battery housing, and the water outlet of the liquid flow channel of the motor housing 100 and the water outlet of the liquid flow channel 460 of the battery housing are both connected to the water inlet of the second water tank cooling module 410. Due to this arrangement, the second water tank cooling module 410, the second control valve 430 and the liquid flow channel of the motor housing 100 form a motor liquid cooling circulation. When the thermal management controller 600 controls the first water outlet of the second control valve 430 to be opened and connect to the water inlet of the second control valve 430 (port 4 and port 5 of the second control valve 430 shown in FIG. 3 are connected), the liquid flows from the second water tank cooling module 410 and passes through the second control valve 430 and the liquid flow channel of the motor housing 100 in sequence, and finally returns to the second water tank cooling module 410. The liquid in the second liquid flow loop is cooled by the second water tank cooling module 410, thereby achieving a cooling effect of the motor. Thus, the thermal management system provided in this embodiment of the present application has a better cooling effect on the motor. The second water tank cooling module 410, the second control valve 430 and the liquid flow channel 460 of the battery housing form a battery housing liquid cooling circulation. When the thermal management controller 600 controls the second water outlet of the second control valve 430 to connect to the water inlet of the second control valve 430 (port 4 and port 6 of the second control valve 430 shown in FIG. 3 are connected), the liquid flows from the second water tank cooling module 410 and passes through the second control valve 430 and the liquid flow channel 460 of the battery housing in sequence, and finally returns to the second water tank cooling module 410. The second water tank cooling module 410 and the liquid flow channel 460 of the battery housing have a further heat dissipation effect on the battery module 500. Thus, the thermal management system provided in this embodiment of the present application has a better heat dissipation effect on the battery module 500.

Optionally, a second water pump 420 is provided between the second water tank cooling module 410 and the second control valve 430, the second water pump 420 is configured to drive the liquid to flow in the second liquid flow loop. Specifically, a water outlet of the second water tank cooling module 410 is connected to the water inlet of the second control valve 430 through the second water pump 420. That is, the water outlet of the second water tank cooling module 410 is connected to a water inlet of the second water pump 420, and a water outlet of the second water pump 420 is connected to the water inlet of the second control valve 430.

In one specific embodiment, the second water tank cooling module 410 includes a second water inlet tank 411, a second water outlet tank 412, and a second radiator 413. A second connecting channel is formed in the second radiator 413. A water inlet of the second water tank cooling module 410 is formed in the second water inlet tank 411, and a water outlet of the second water tank cooling module 410 is formed in the second water outlet tank 412. The second water inlet tank 411 and the second water outlet tank 412 are located on opposite sides of the second radiator 413, respectively, and the second water inlet tank 411 and the second water outlet tank 412 are connected through the second connecting channel in the second radiator 413. In this embodiment, when the first water outlet of the second control valve 430 is connected to the water inlet of the second control valve 430 (port 4 and port 5 of the second control valve 430 are connected, as shown in FIG. 3), liquid in the second water outlet tank 412 flows from the water outlet of the second water outlet tank 412 (i.e., the water outlet of the second water tank cooling module 410) and passes through the second water pump 420, the second control valve 430, and the liquid flow channel of the motor housing 100, and then flows into the second water inlet tank 411 through the water inlet of the second water inlet tank 411 (i.e., the water inlet of the second water tank cooling module 410), and finally flows back to the second water outlet tank 412 through the second connecting channel in the second radiator 413. When the second water outlet of the second control valve 430 is connected to the water inlet of the second control valve 430 (the port 4 and the port 6 in the second control valve 430 are connected, as shown in FIG. 3), liquid in the second outlet tank 412 flows from the water outlet of the second outlet tank 412, passes through the second water pump 420, the second control valve 430, and the liquid flow channel 460 of the battery housing in sequence, and then flows into the second water inlet tank 411 through the water inlet of the second inlet tank 411, and finally flows back to the second water outlet tank 412 through the second connecting channel in the second radiator 413. Due to this arrangement, water is reserved in the second water inlet tank 411 and the second water outlet tank 412, and the liquid flowing through the second connecting channel is cooled by the second radiator 413. Thus, the second water tank cooling module 410 has both water storage and cooling functions, and thereby further reduces the structural complexity of the thermal management system.

Figure 8:
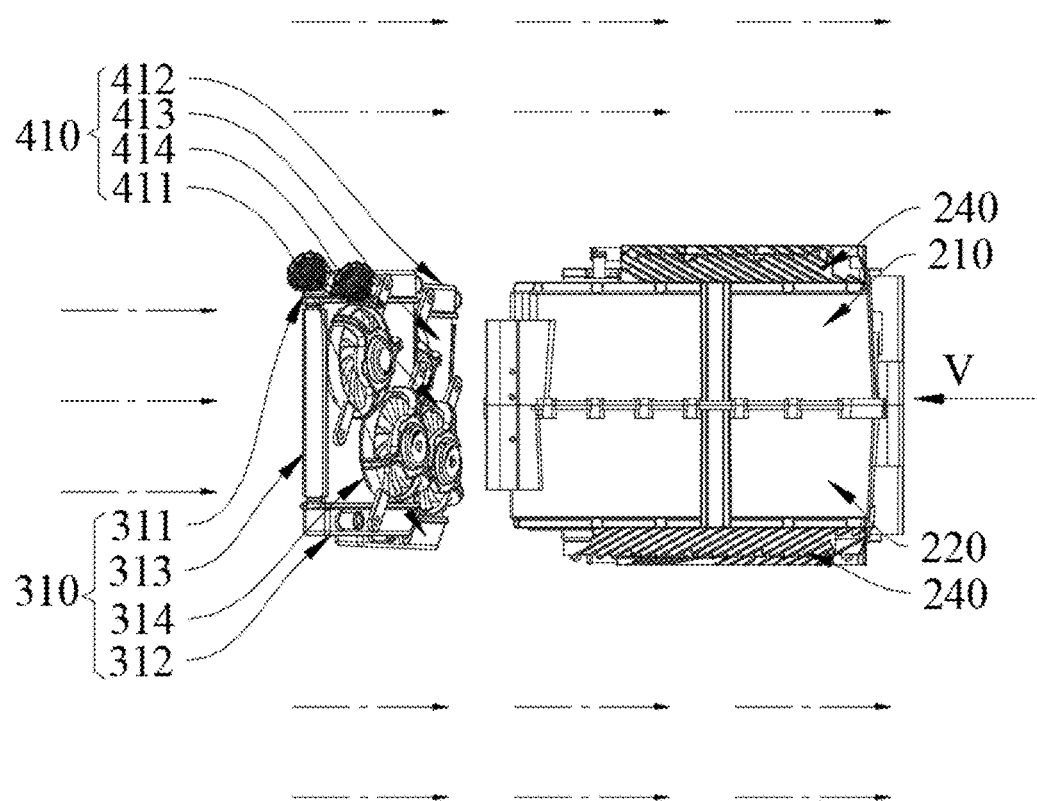
FIG. 8 illustrates a schematic structural diagram of a part of the thermal management system of the electric motorcycle in accordance with one embodiment of the present application.

In some embodiments, the first water tank cooling module 310 and the second water tank cooling module 410 may be mounted on either side of the battery housing 200. The specific mounting positions of the first water tank cooling module 310 and the second water tank cooling module 410 may be determined according to the actual mounting space and heat dissipation requirements. Thus, the thermal management system has a more compact structure and a reduced space occupation. Exemplarily, as shown in FIG. 8, both the first water tank cooling module 310 and the second water tank cooling module 410 are mounted on a windward side of the battery housing 200. It is worth noting that the windward side of the battery housing 200 is the side of the battery housing 200 in the driving direction. The driving direction is the moving direction of the electric motorcycle during driving process, and the driving direction is an unidirectional direction. In the accompanying figures of the embodiments of the present application, the driving direction is shown by the direction indicated by the unidirectional arrow V. Thus, the first water tank cooling module 310 and the second water tank cooling module 410 are mounted on the windward side of the battery housing 200, that is, the first water tank cooling module 310 and the second water tank cooling module 410 are mounted on the side of the battery housing 200 in the direction indicated by an unidirectional arrow V. It is worth noting that the direction indicated by a dotted arrow in FIG. 8 is an airflow direction during the driving of the electric motorcycle.

Optionally, the first water tank cooling module 310 further includes a first cooling fan 314, the first cooling fan 314 may be mounted on either side of the first heat sink 313, and an air outlet of the first cooling fan 314 is opposite to the first heat sink 313. Specifically, the first cooling fan 314 is mounted between the first heat sink 313 and the battery housing 200, while the air outlet of the first cooling fan 314 faces the first heat sink 313. The first cooling fan 314 has a signal connection with the thermal management controller 600, and the thermal management controller 600 is further configured to control a switched on/off state of the first cooling fan 314. Due to this arrangement, during a charging process of the electric motorcycle, the first cooling fan 314 may be controlled to be switched on through the thermal management controller 600 and blows air to the first radiator 313, thereby facilitating in cooling the liquid in the first communication channel by the first radiator 313, and thereby improving the heat dissipation effect of the first water tank cooling module 310 during the charging process of the electric motorcycle. Since the first water tank cooling module 310 is located on the windward side of the battery housing 200, the airflow generated during the driving process of the electric motorcycle may pass over the first heat sink 313, which facilitates in colling the liquid in the first communication channel by the first heat sink 313, thereby improving the heat dissipation effect of the first water tank cooling module 310 during the charging process of the electric motorcycle. Not only the heat dissipation effect of the first water tank cooling module 310 is improved during the driving process of the electric motorcycle, energy consumption is also reduced to a certain extent. Optionally, there may be a plurality of first cooling fans 314, and the plurality of first cooling fans 314 have signal connection with the thermal management controller 600. For example, the number of first cooling fans 314 is two, and the two first cooling fans 314 are mounted between the first heat sink 313 and the battery housing 200. The two air outlets of the two first cooling fans 314 are opposite to the first heat sink 313, respectively.

Optionally, the second water tank cooling module 410 further includes a second cooling fan 414 which can be mounted on either side of the second heat sink 413, and an air outlet of the second cooling fan 414 is opposite to the second heat sink 413. Specifically, the second cooling fan 414 is mounted between the second heat sink 413 and the battery housing 200, while the air outlet of the second cooling fan 414 faces the second heat sink 413. The second cooling fan 414 has a signal connection with the thermal management controller 600, and the thermal management controller 600 is further configured to control the switched on/off state of the second cooling fan 414. Due to this arrangement, during the charging process of the electric motorcycle, the thermal management controller 600 may control the second cooling fan 414 to be switched on, such that the second cooling fan 414 blows air to the second radiator 413, thereby facilitating the second radiator 413 in cooling the liquid in the second communication channel, and thereby improving the heat dissipation effect of the second water tank cooling module 410 during the charging process of the electric motorcycle. Since the second water tank cooling module 410 is located on the windward side of the battery housing 200, the airflow generated during the driving process of the electric motorcycle may pass over the second heat sink 413, which facilitates in cooling of the liquid in the second communication channel by the second heat sink 413, thereby improving the heat dissipation effect of the second water tank cooling module 410 during the charging process of the electric motorcycle. Not only the heat dissipation effect of the second water tank cooling module 410 is improved during the driving process of the electric motorcycle, energy consumption is further reduced. Optionally, there may be a plurality of second cooling fans 414, and the plurality of second cooling fans 414 have signal connection with the thermal management controller 600. For example, the number of the second cooling fans 414 is two, and the two second cooling fans 414 are mounted between the second heat sink 413 and the battery housing 200. The two air outlets of the two second cooling fans 414 are opposite to the second heat sink 413, respectively.

In some embodiments, as shown in FIG. 1 and FIG. 2, the thermal management controller 600 is mounted on the windward side of the battery housing 200. In this way, the airflow may pass through the thermal management controller 600 during the driving of the electric motorcycle, thereby having a certain heat dissipation effect on the thermal management controller 600.

In some embodiments, as shown in FIG. 2, the outer surface of the thermal management controller 600 is provided with heat dissipation teeth 240. Due to this arrangement, the heat dissipation teeth 240 on the outer surface of the thermal management controller 600 may achieve a better heat dissipation effect on the thermal management controller 600. Optionally, the thermal management controller 600 is mounted on the windward side of the battery housing 200.

Figure 9:
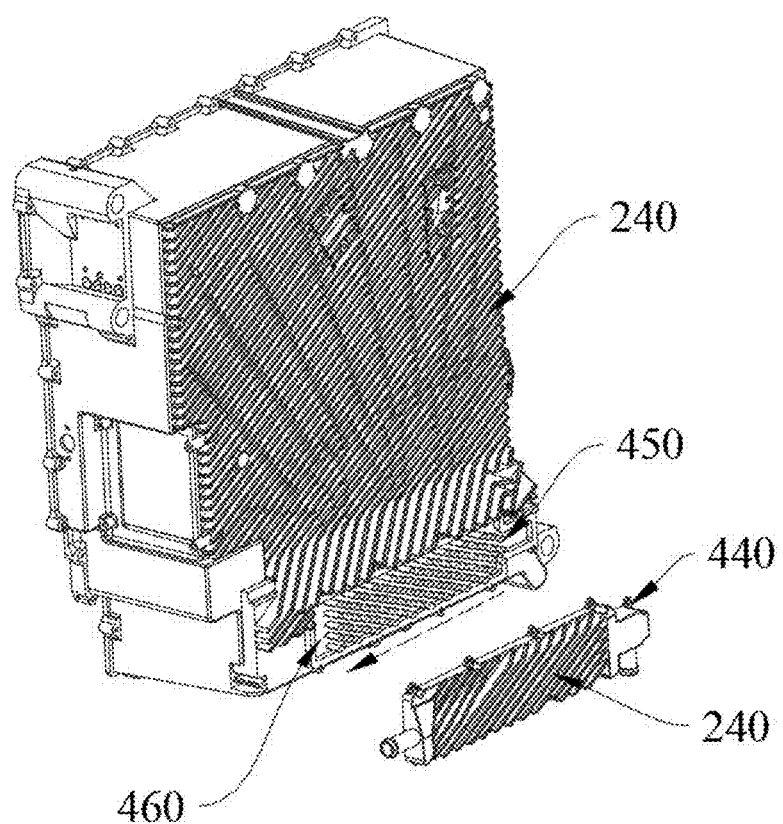
FIG. 9 illustrates a schematic diagram of a relative position of a battery housing and a cover body in the thermal management system of the electric motorcycle in accordance with one embodiment of the present application.

In some embodiments, as shown in FIG. 7 and FIG. 9, the battery housing 200 has an mounting area, one side of the mounting area is connected to the semiconductor component 340, and the opposite side forms the liquid flow channel 460 of the battery housing. Due to this arrangement, the liquid flow channel 460 of the battery housing is connected to the semiconductor component 340 through the mounting area of the battery housing 200. Thus, after the semiconductor component 340 transfers heat to the battery housing 200, the heat on the battery housing 200 may be immediately taken away by the liquid in the liquid flow channel 460 of the battery housing, thereby improving the heat dissipation efficiency of the battery housing 200, and facilitating improvement of the heat transfer rate and the cooling effect of the semiconductor component 340, and thereby further improving the heat dissipation effect of the battery module 500. Optionally, one side of the mounting area is specifically connected to the semiconductor chilling plate 342 in the semiconductor component 340 through the heat absorption end of the first short pipe 231. It is worth noting that the direction indicated by a dotted arrow in FIG. 9 is the flow direction of the liquid in the liquid flow channel 460 of the battery housing.

In some embodiments, as shown in FIG. 7 and FIG. 9, a plurality of spoiler columns 450 are arranged at intervals in the liquid flow channel 460 of the battery housing. By arranging the spoiler columns 450, a contact area between the liquid in the liquid flow channel 460 of the battery housing and the inner wall of the battery housing is increased, and a heat exchange capacity is improved.

In some embodiments, as shown in FIG. 9, the spoiler column 450 is arranged on a first inner wall of the liquid flow channel 460 of the battery housing, and a projection shape of the spoiler column 450 on the first inner wall is a water drop shape. The arranging of the water drop-shaped spoiler column 450 is also conductive to reduce the flow resistance of the liquid in the liquid flow channel 460 of the battery housing on the basis of improving the heat exchange capacity.

In some embodiments, as shown in FIG. 9, a semiconductor component 340 is mounted on the inner surface of the mounting area, and a cover body 440 is arranged to be covered on the outer surface of the mounting area. The cover body 440 and the outer surface of the mounting area are enclosed to form the liquid flow channel 460 of the battery housing, and the plurality of spoiler columns 450 are arranged at intervals on the outer surface of the mounting area. This arrangement is conducive to rapidly conducting the heat in the semiconductor component 340 to the liquid in the liquid flow channel 460 of the battery housing, and the heat is taken away by the liquid in the liquid flow channel 460 of the battery housing. Since the battery module 500 is accommodated in the battery housing 20, the battery housing 200 must have an inner cavity for accommodating the battery module 500. It is worth noting that the inner surface of the mounting area specifically refer to a side of the mounting area facing the inner cavity of the battery housing 200, and the outer surface of the mounting area specifically refers to a side of the mounting area facing the outside of the battery housing 200.

Specifically, an inner surface of the mounting area is connected to the semiconductor chilling plate 342 in the semiconductor component 340 through the heat absorption end of the first short pipe 231, in this way, the semiconductor component 340 is mounted on the inner surface of the mounting area. The heat generated by the battery module 500 is transferred to the first water tank cooling module 310 through the liquid in the liquid flow channel 5212 of the battery module. After a preliminary cooling performed by the first water tank cooling module 310, the remaining heat flows into the heat-cold exchange liquid flow channel 3431 of the heat exchange structure 343 in the semiconductor component 340. This part of the heat is sequentially transferred to the semiconductor chilling plate 342, the heat absorption end of the first short pipe 231, and the liquid flow channel 460 of the battery module through the heat exchange structure 343, and then is transferred to the cover 440 and the second water tank cooling module 410 in order for heat dissipation, thereby improving the heat dissipation effect.

Optionally, the plurality of spoiler columns 450 may be only arranged at intervals on the outer surface of the mounting area, or may be only arranged on a side of the cover body 440 facing the mounting area. Alternatively, some spoiler columns 450 are arranged at intervals on the outer surface of the mounting area, and other spoiler columns 450 are arranged at intervals on the side of the cover body 440 facing the mounting area. By arranging the plurality of spoiler columns 450 on the cover body 440, it is beneficial to improve the heat exchange capacity between the liquid in the liquid flow channel 460 of the battery housing and the cover body 440, such that some of the heat may be directly conducted to the outside through the cover body 440, and the heat dissipation effect of the battery module 500 is improved accordingly.

In some embodiments, as shown in FIG. 9, the outer surface of the cover body 440 is provided with heat dissipation teeth 240. Due to this arrangement, the heat dissipation capacity of the battery module 500 is further improved.

In some embodiments, as shown in FIG. 2, multiple side walls of the battery housing 200 has mounting areas respectively, one side of each mounting area is connected to one semiconductor component 340, and a liquid flow channel 460 of the battery housing is formed on the opposite side. That is, in this arrangement, both the number of the semiconductor components 340 and the number of the liquid flow channels 460 of the battery housing are plural, and the plurality of semiconductor components 340 and the plurality of liquid flow channels 460 of the battery housing are arranged in a one-to-one correspondence manner. In this way, further improvement of the heat dissipation effect is facilitated.

Optionally, as shown in FIG. 4, the liquid flow relationship between the plurality of semiconductor components 340 may be a series connection or be a parallel connection. Exemplarily, the heat-cold exchange liquid flow channels 3431 in the heat exchange structure 343 of the plurality of semiconductor components 340 are connected in series in sequence, and form a first total water inlet and a first total water outlet. The water outlet of the first control valve 330 is connected to the first total water inlet, and the first total water outlet is connected to the water inlet of the liquid flow channel 5212 of the battery module.

Optionally, the liquid flow relationship between the plurality of liquid flow channels 460 of the battery housing may be series connection or parallel connection. Exemplarily, the plurality of liquid flow channels of the battery housing 460 are connected in series in sequence to form a second total water inlet and a second total water outlet. The second water outlet of the second control valve 430 is connected to the second total water inlet, and the second total water outlet is connected to the water inlet of the second water tank cooling module 410.

Figure 10:
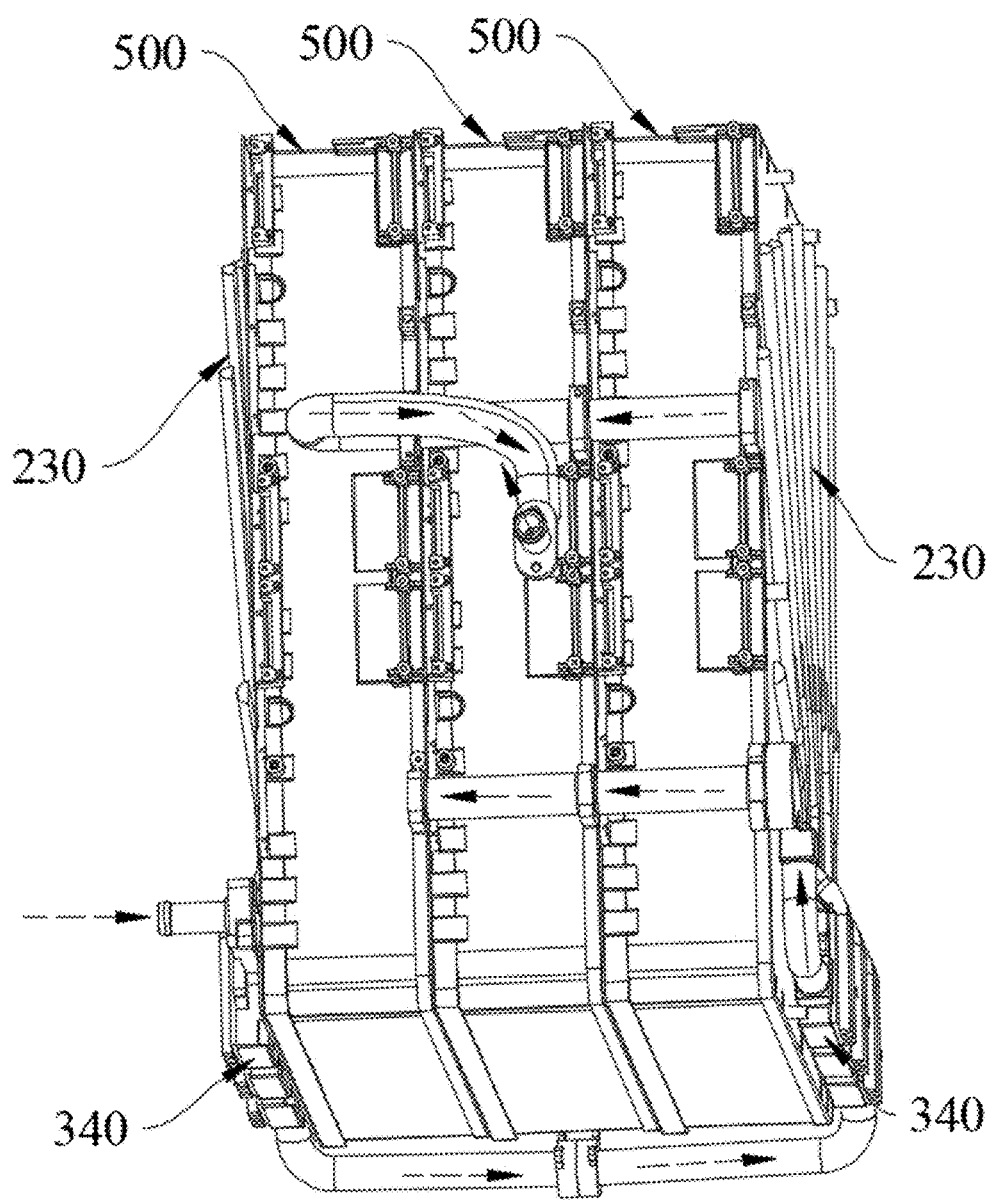
FIG. 10 illustrates a schematic diagram of an assembly of a battery module and the semiconductor components in thermal management system of electric motorcycle in accordance with one embodiment of the present application.
Figure 11:
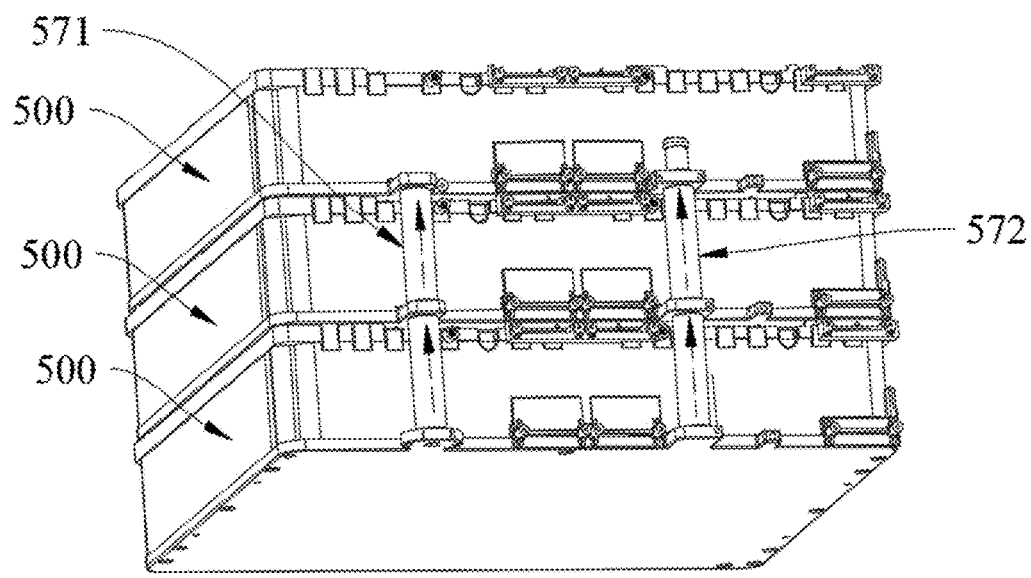
FIG. 11 illustrates a schematic structural diagram of the battery module in the thermal management system of the electric motorcycle in accordance with one embodiment of the present application.

Optionally, as shown in FIG. 2, FIG. 10 and FIG. 11, the number of semiconductor components 340 and the number of the liquid flow channels of the battery housing 460 is two. Exemplarily, the battery housing 200 includes a first half shell 210 and a second half shell 220. Optionally, the first half shell 210 and the second half shell 220 are arranged at intervals along a first direction, the first direction is arranged to be perpendicular to the driving direction. The first half shell 210 and the second half shell 220 are interlocked and enclosed to form a sealed inner cavity, and the battery module 500 is arranged in the sealed inner cavity, due to this arrangement, sealing protection is provided for the battery module 500. A side wall of the first half shell 210 away from the second half shell 220 is provided with a first mounting area, and a side wall of the second half shell 220 away from the first half shell 210 is provided with a second mounting area. As shown in FIG. 7, the side of the first mounting area facing the sealed inner cavity is connected to a semiconductor chilling plate 342 of one semiconductor component 340 through the heat absorption end of the first short pipe 231, and the side of the first mounting area facing away from the sealed inner cavity is covered with a cover body 440, such that the side of the first mounting area facing away from the sealed inner cavity and the cover body 440 are enclosed to form a liquid flow channel 460 of the battery housing. The side of the second mounting area facing the sealed inner cavity is connected to a semiconductor chilling plate 342 of the other semiconductor component 340 through the heat absorption end of the first short pipe 231, and the side of the second mounting area facing away from the sealed inner cavity is covered with another cover body 440, such that the side of the second mounting area facing away from the sealed inner cavity and the cover body 440 are enclosed to form another liquid flow channel 460 of the battery housing.

Optionally, as shown in FIG. 8, the side wall of the first half shell 210 away from the second half shell 220 and the side wall of the second half shell 220 away from the first half shell 210 are parallel to the driving direction. An outer surface of the side wall of the first half shell 210 away from the second half shell 220 is provided with heat dissipation teeth 240, and the outer surface of the side wall of the second half shell 220 away from the first half shell 210 is also provided with heat dissipation teeth 240. Due to this arrangement, the heat exchange capacity between the battery housing 200 and the outside air is enhanced, and it is beneficial for the airflow to pass through the heat dissipation teeth 240 and form a disturbance, and take away a large amount of heat, especially during the driving process of the electric motorcycle. Optionally, the heat dissipation tooth 240 may be arranged on the side of the first half shell 210 and the side of the second half shell 220 in the driving direction, that is, the heat dissipation teeth 240 are arranged on the side of the first half shell 210 and the side of the second half shell 220 in the direction indicated by the unidirectional arrow V. Due to this arrangement, the heat exchange capacity between the battery housing 200 and the outside air may be further improved, and the heat dissipation effect is improved accordingly. In this embodiment of the present application, the thickness, the spacing and the orientation of the heat dissipation teeth 240 may be determined according to a simulation result and an airduct outside the battery housing 200.

Figure 12:
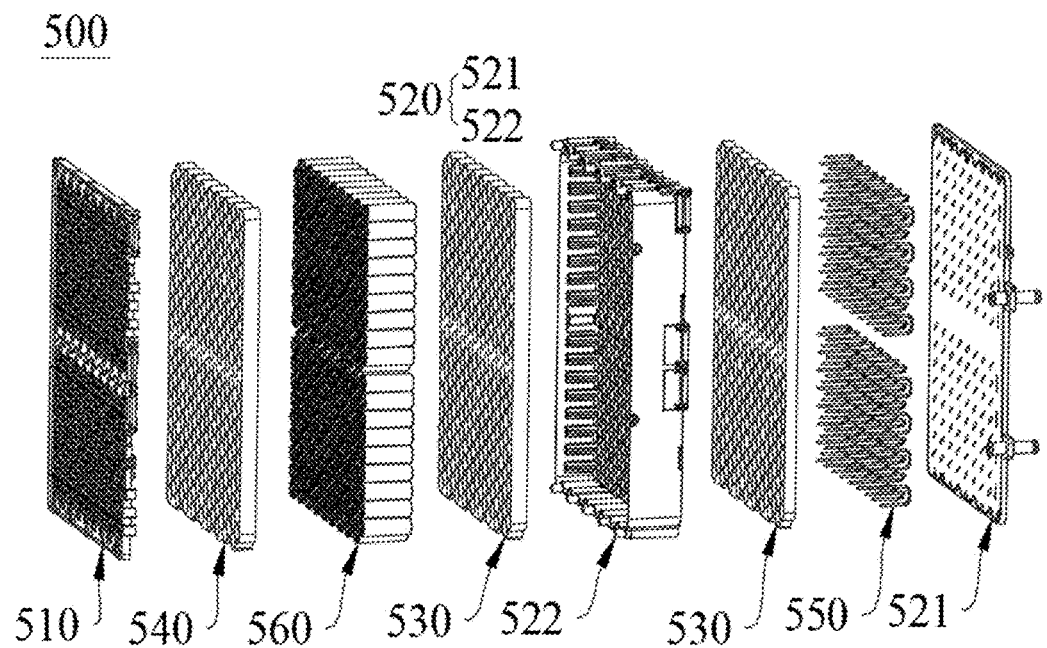
FIG. 12 illustrates a schematic exploded diagram of components of the battery module in thermal management system of the electric motorcycle in accordance with one embodiment of the present application.
Figure 13:
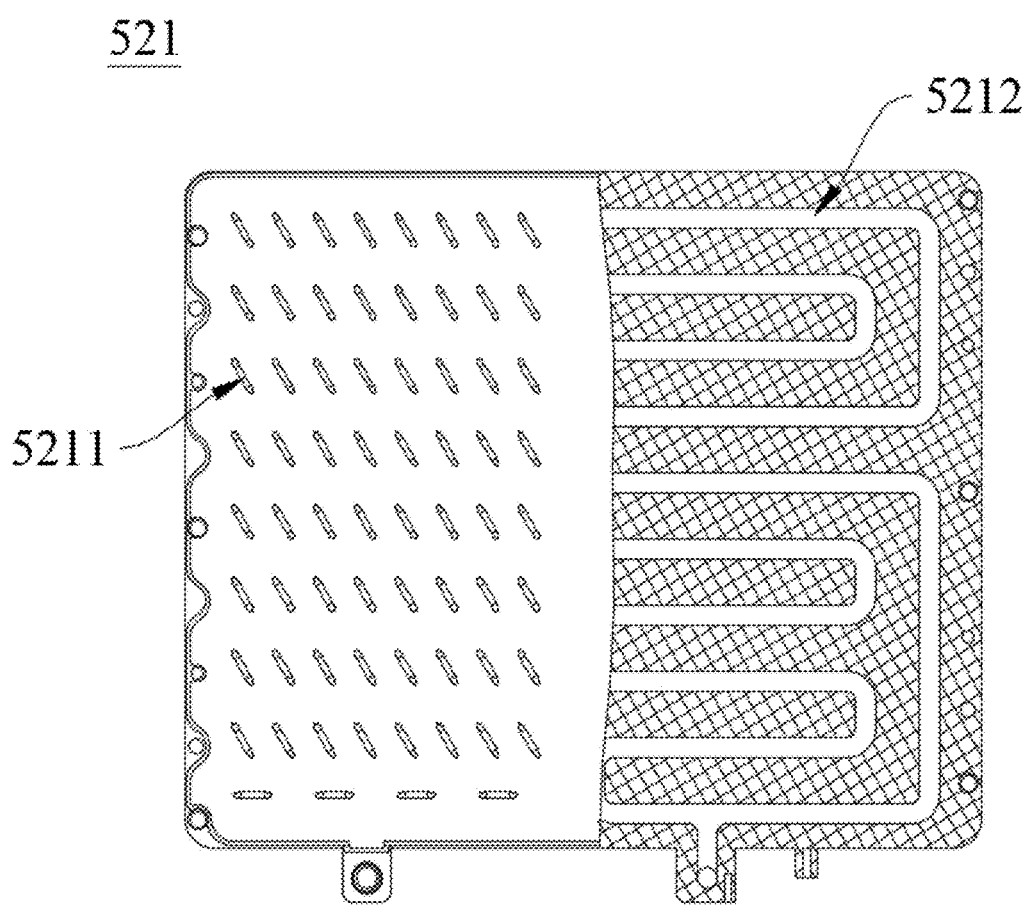
FIG. 13 illustrates a partial cross-sectional view of a liquid cooling plate in thermal management system of the electric motorcycle in accordance with one embodiment of the present application.

In some embodiments, as shown in FIG. 12 and FIG. 13, the battery module 500 includes a liquid cooler 520, a battery cell holder 510 and a plurality of battery cells 560. The liquid cooler 520 and the battery cell holder 510 are enclosed to form an accommodation space. The accommodation space accommodates a plurality of battery cells 560. The liquid cooler 520 is provided with the liquid flow channel 5212 of the battery module. Due to this arrangement, when the liquid flows through the liquid flow channel 5212 of the battery module, the liquid may take away at least some of the heat generated by the plurality of battery cells 560, thereby achieving a better heat dissipation effect on the plurality of battery cells 560, that is, achieving a better heat dissipation effect on the battery module 500.

In some embodiments, as shown in FIG. 12 and FIG. 13, the liquid cooler 520 specifically includes a liquid cooling plate 521 and a liquid cooling plate holder 522, the liquid flow channel 5212 of the battery module is specifically formed on the liquid cooling plate 521. In this embodiment, both the liquid cooling plate 521 and the battery holder 510 are plate structures, the liquid cooling plate holder 522 is mounted on the side of the liquid cooling plate 521 facing the battery cell holder 510, the liquid cooling plate holder 522 is provided with a groove facing the battery holder 510, and the battery holder 510 covers an opening of the groove, due to this arrangement, the battery cell holder 510, the liquid cooling plate holder 522 and the liquid cooling plate 521 are enclosed to form an accommodation space for accommodating the battery 560.

Figure 14:
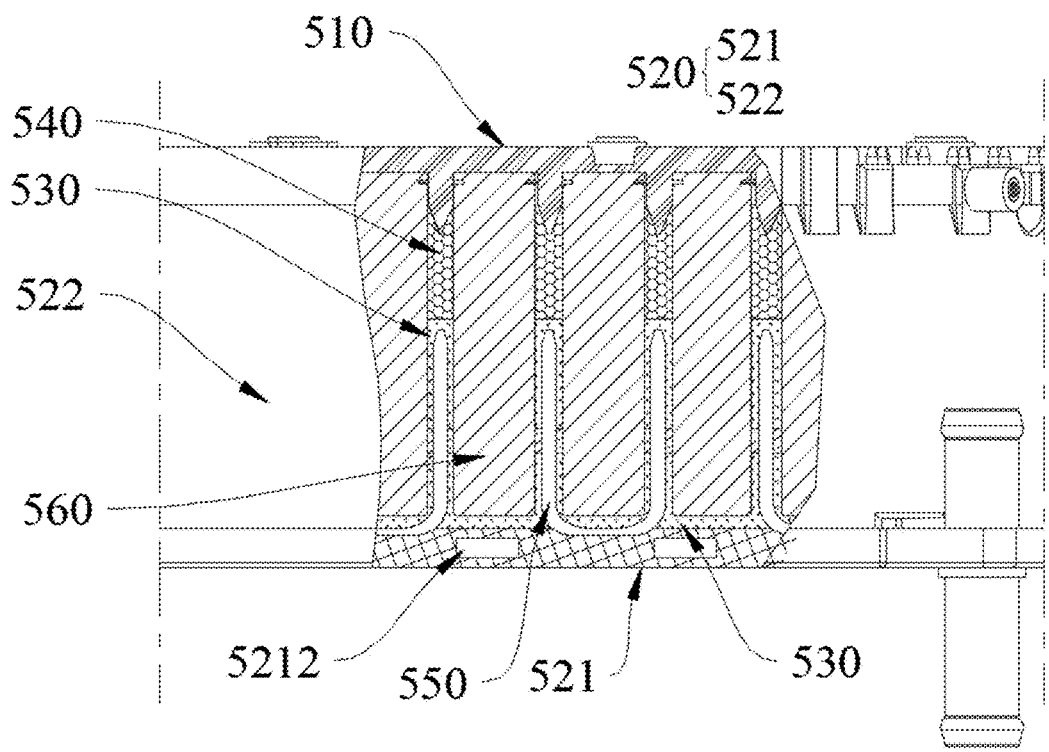
FIG. 14 illustrates a partial cross-sectional view of the battery module in thermal management system of the electric motorcycle in accordance with one embodiment of the present application.
Figure 15:
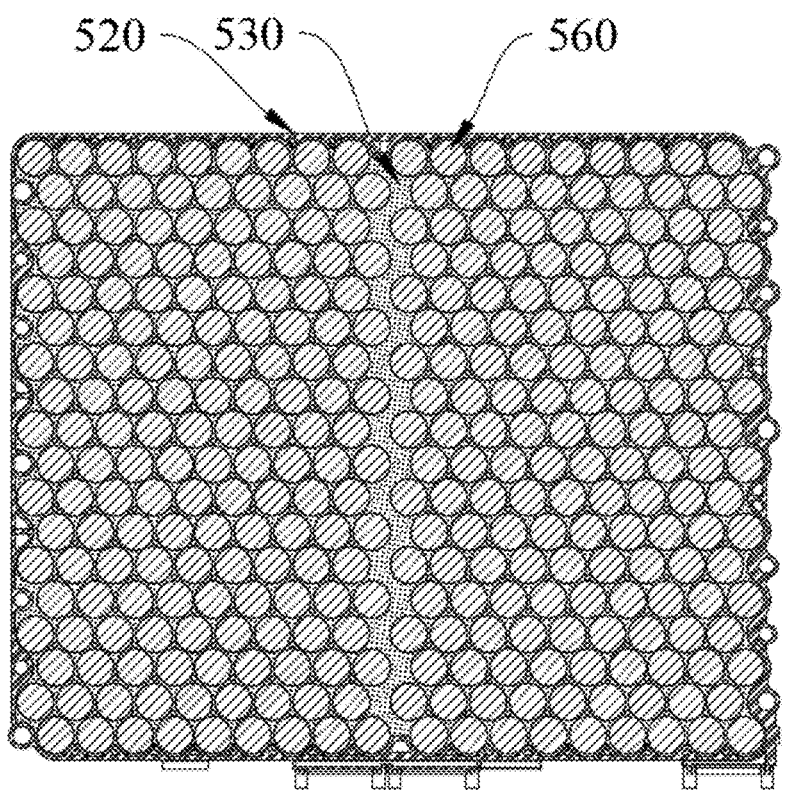
FIG. 15 illustrates a cross-sectional view of the battery module in thermal management system of the electric motorcycle in accordance with one embodiment of the present application.

In some embodiments, as shown in FIG. 12, FIG. 14 and FIG. 15, the accommodation space is filled with thermal conducting adhesive 530, and the thermal conducting adhesive 530 is provided between the battery cell 560 and the liquid cooler 520 and between two adjacent battery cells 560. The thermal conducting adhesive 530 has a strong thermal conductivity. Thus, by filling the thermal conducting adhesive 530 between the battery cell 560 and the liquid cooler 520, the improvement on the heat dissipation effect of the battery 560 is facilitated.

In some embodiments, as shown in FIG. 12, a plurality of first heat pipes 550 are arranged at intervals in the accommodation space, each of the first heat pipes 550 includes a first heat absorption end and a first heat releasing end. One first heat absorption end is arranged in the gap between two adjacent battery cells 560, and the first heat releasing end of each first heat pipe 550 is connected to the liquid cooler 520, and each first heat pipe 550 is buried in the thermal conducting adhesive 530. By providing the first heat pipe 550, the heat exchange capacity between the thermal conducting adhesive 530 and the liquid cooler 520 is improved, and the heat dissipation effect of the battery cell 560 is improved accordingly. Optionally, the thermal conducting adhesive 530 is specifically a thermal conductive potting adhesive. The thermal conductive potting adhesive has an insulating effect for preventing short circuit between multiple adjacent battery cells 560, thereby improving safety performance.

Figure 16:
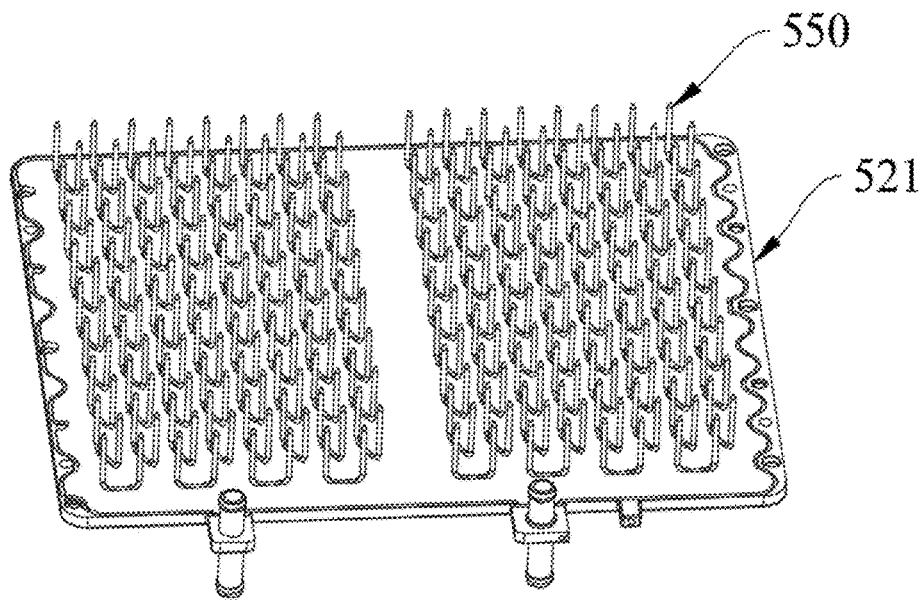
FIG. 16 illustrates a schematic diagram of an assembly of the liquid cooling plate and a first heat pipe in thermal management system of the electric motorcycle in accordance with one embodiment of the present application.

Optionally, the first heat releasing end of the first heat pipe 550 is specifically connected to the liquid cooling plate 521 in the liquid cooler 520. Exemplarily, as shown in FIG. 13 and FIG. 16, a plurality of mounting grooves 5211 are provided on the liquid cooling plate 521, the plurality of mounting grooves 5211 are arranged to correspond to the plurality of first heat pipes 550 in a one-to-one correspondence manner. The first heat release ends of the plurality of first heat pipes 550 are mounted in the corresponding mounting grooves 5211. Optionally, the first heat release ends of the plurality of first heat pipes 550 are mounted in the corresponding mounting grooves 5211 by using a riveting method. During the heat conduction process, the thermal conducting adhesive 530 absorbs the heat generated by the battery cell 560, the first heat absorption end absorbs the heat of the thermal conducting adhesive 530, and the first heat release end conducts the heat to the liquid in the liquid flow channel 5212 of the battery module in the liquid cooling plate 521. When the liquid in the liquid flow channel 5212 of the battery module flows through the semiconductor component 340 or the first water tank cooling module 310, the heat may be dissipated through the semiconductor component 340 or the first water tank cooling module 310.

In some embodiments, as shown in FIG. 16, the first heat pipe 550 is a U-shaped pipe, and the U-shaped pipe has two extension parts and a middle part arranged between the two extension parts, and the middle part is respectively connected to the two extension parts. The two extension parts are the two first heat absorption ends, and the middle part is the first heat release end.

In some embodiments, each battery cell 560 is connected to the battery cell holder 510, and the thermal conducting adhesive 530 is arranged to be spaced from the battery cell holder 510, and the thermal insulating adhesive 540 is filled between the thermal conducting adhesive 530 and the battery cell holder 510. By arranging the thermal insulating adhesive 540, an occurrence of thermal runaway and heat spread may be effectively avoided, and thus the safety of the battery module 500 is ensured. Optionally, the thermal insulating adhesive 540 is specifically a thermal insulating potting adhesive. Similarly, the thermal insulating potting adhesive also has the insulating effect for preventing short circuit between multiple adjacent battery cells 560 and thereby improving the safety performance.

In some embodiments, as shown in FIG. 10 and FIG. 11, a plurality of the battery modules 500 are provided, and the liquid flow channels 5212 of the battery modules in the liquid coolers 520 of the battery modules 500 are connected in parallel, and the liquid flow channels 5212 of the battery modules are all connected to the semiconductor component 340. Due to this arrangement, a thermal cascade effect between the plurality of battery modules 500 is avoided, and the safety of the battery module 500 is further ensured.

As an example, as shown in FIG. 10 and FIG. 11, the thermal management system includes a total water inlet pipe 571 and a total water outlet pipe 572. The total water inlet pipe 571 is provided with multiple water outlets, and the multiple water outlets of the total water inlet pipe 571 are arranged to correspond to the plurality of battery modules 500 in a one-to-one correspondence manner. Each water outlet of the total water inlet pipe 571 is connected to the water inlet of the liquid flow channel 5212 of the battery module in the liquid cooling plate 521 of the corresponding battery module 500, and a water inlet of the total water inlet pipe 571 is connected to a water outlet of the semiconductor component 340. When a plurality of semiconductor components 340 are provided, the water inlet of the total water inlet pipe 571 is connected to the first total water outlet formed by the heat-cold exchange liquid flow channels 3431 connected in series in the plurality of semiconductor components 340. The total water outlet pipe 572 is provided with multiple water inlets, and the multiple water inlets of the total water outlet pipe 572 are arranged to correspond to the plurality of battery modules 500 in a one-to-one correspondence manner. The multiple water inlets of the total water outlet pipe 572 is connected to the water outlet of the liquid flow channel 5212 of the battery module in the liquid cooling plate 521 of the corresponding battery module 500, and the water outlet of the total water outlet pipe is respectively connected to the second water inlet of the first control valve 330 and the water inlet of the first water tank cooling module 310.

In some embodiments, the thermal management system further includes a temperature sensor. The temperature sensor is arranged in the battery module 500 and is configured to detect the temperature of the battery module 500. Specifically, the temperature sensor is arranged in the battery cell holder 510 in the battery module 500, and the temperature sensor is specifically configured to detect the temperature of the battery cell 560 in the battery module 500. There is a signal connection between the temperature sensor and the thermal management controller 600. The temperature sensor is configured to detect the temperature of the battery cell 560 in the battery module 500 and provide a detection result to the thermal management controller 600. The thermal management controller 600 is specifically configured to control the first control valve 330, the second control valve 430 and the semiconductor component 340 to perform different operating modes according to the information fed back by the temperature sensor.

A thermal management method of an electric motorcycle is further provided in another embodiment of the present application. This thermal management method is applicable to the thermal management system of the electric motorcycle provided by any of the aforesaid technical solutions. The thermal management method includes:

determining an operating condition of the thermal management system, the operating condition includes a charging condition and a discharge condition;

obtaining a temperature value of a battery module 500, and comparing the temperature value of the battery module 500 with a preset charging temperature threshold or a preset discharge temperature threshold;

in the charging condition, controlling the first control valve 330 600 by the thermal management controller to allow the liquid in the first liquid flow loop to flow through the first liquid flow loop, or respectively controlling the first control valve 330 and the second control valve 430 by the thermal management controller 600 to allow the liquid in the first liquid flow loop to flow through the first liquid flow loop and allow the liquid in the liquid flow channel 460 of the battery housing to flow through the liquid flow channel 460 of the battery housing, according to the comparison result of the temperature value of the battery module 500 and the preset charging temperature threshold;

in the discharge condition, according to a comparison result of the temperature value of the battery module 500 and the preset discharge temperature threshold, respectively controlling the first control valve 330 and the second control valve 430 by the thermal management controller 600 to allow the liquid in the first liquid flow loop to flow through the first liquid flow loop and allow the liquid in the liquid flow channel of the motor housing 100 to flow through the liquid flow channel of the motor housing 100.

According to the thermal management method of the electric motorcycle in this embodiment of the present application, it is possible to selectively control the first control valve 330 alone or separately control the first control valve 330 and the second control valve 430 according to the temperature of the battery module 500 through the thermal management controller 600 in the charging condition (i.e., during the charging process of the electric motorcycle), so as to adjust the heat dissipation effect of the battery module 500. When the temperature of the battery module 500 is relatively lower or slightly higher, the thermal management controller 600 may control the first control valve 330 to allow the liquid in the first liquid flow loop to flow so as to preserve the heat of the battery module 500 or dissipate the heat of the battery module 500 preliminarily. When the temperature of the battery module 500 is higher, the thermal management controller 600 may control the first control valve 330 and the second control valve 430 separately to improve the heat dissipation effect of the battery module 500.

In the discharge condition (i.e., during the driving process of the electric motorcycle), the thermal management controller 600 may control the first control valve 330 and the second control valve 430 according to the temperature of the battery module 500, to enable the liquid in the first liquid flow loop to flow so as to preserve the heat of the battery module 500 or dissipate the heat. Moreover, the liquid in the liquid flow channel of the motor housing 100 in the second liquid flow loop dissipates heat of the motor. Since there is airflow passing through the battery housing 200 during the driving process of the electric motorcycle, the heat dissipation rate of the battery module 500 may also be increased, even if liquid does not flow in the liquid flow channel of the battery housing.

In conclusion, the thermal management method of the electric motorcycle provided in this embodiment of the present application may achieve excellent heat dissipation effect on the battery module 500 during the driving process and the charging process of the electric motorcycle, and may also achieve an excellent heat dissipation effect on the motor during the driving process of the electric motorcycle. Thus, the whole electric motorcycle has a better heat dissipation effect.

In some embodiments, determining the operating condition of the thermal management system is specifically determining the operating condition of the battery module 500. When the battery module 500 is in a discharge state, it means that the thermal management system is in the discharge condition. When the battery module 500 is in a charging state, it means that the thermal management system is in the charging condition. Optionally, the operating condition of the battery module 500 may be monitored and determined by a battery management system (Battery Management System, BMS).

In some embodiments, obtaining the temperature value of the battery module 500 is specifically obtaining the temperature value of the battery cell 560 in the battery module 500. Optionally, the temperature value of the battery cell 560 in the battery module 500 may be obtained by a temperature sensor arranged on the battery module 500.

In some embodiments, the first liquid flow loop includes a liquid flow channel 5212 of the battery module, a semiconductor component 340 and a first water tank cooling module 310. A water outlet of the first water tank cooling module 310 is connected to a first water inlet of the first control valve 330, a water outlet of the first control valve 330 is connected to a water inlet of the semiconductor component 340, a water outlet of the semiconductor component 340 is connected to a water inlet of the liquid flow channel 5212 of the battery module. A water outlet of the liquid flow channel 5212 of the battery module is respectively connected to a water inlet of the first water tank cooling module 310 and a second water inlet of the first control valve 330.

The preset charging temperature threshold includes a charging low temperature threshold, a first charging temperature threshold, a second charging temperature threshold and a third charging temperature threshold. The preset discharge temperature threshold includes a discharge low temperature threshold, a first discharge temperature threshold, a second discharge temperature threshold and a third discharge temperature threshold. Optionally, the charging low temperature threshold and the discharge low temperature threshold may be identical or unidentical, the first charging temperature threshold and the first discharge temperature threshold may be identical or unidentical, the second charging temperature threshold and the second discharge temperature threshold may be identical or unidentical, the third charging temperature threshold and the third discharge temperature threshold may be identical or unidentical. These temperature thresholds are not uniquely limited herein.

Said controlling the first control valve 330 by the thermal management controller 600 according to the comparison result of the temperature value of the battery module 500 and the preset charging temperature threshold or the comparison result of the temperature value of the battery module 500 and the preset discharge temperature threshold specifically includes: controlling the first control valve 330 by the thermal management controller 600 according to the comparison result of the temperature value of the battery module 500 and the preset charging temperature threshold in the charging condition; controlling the first control valve 330 by the thermal management controller 600 according to the comparison result of the temperature value of the battery module 500 and the preset discharge temperature threshold in the discharge condition.

Figure 17:
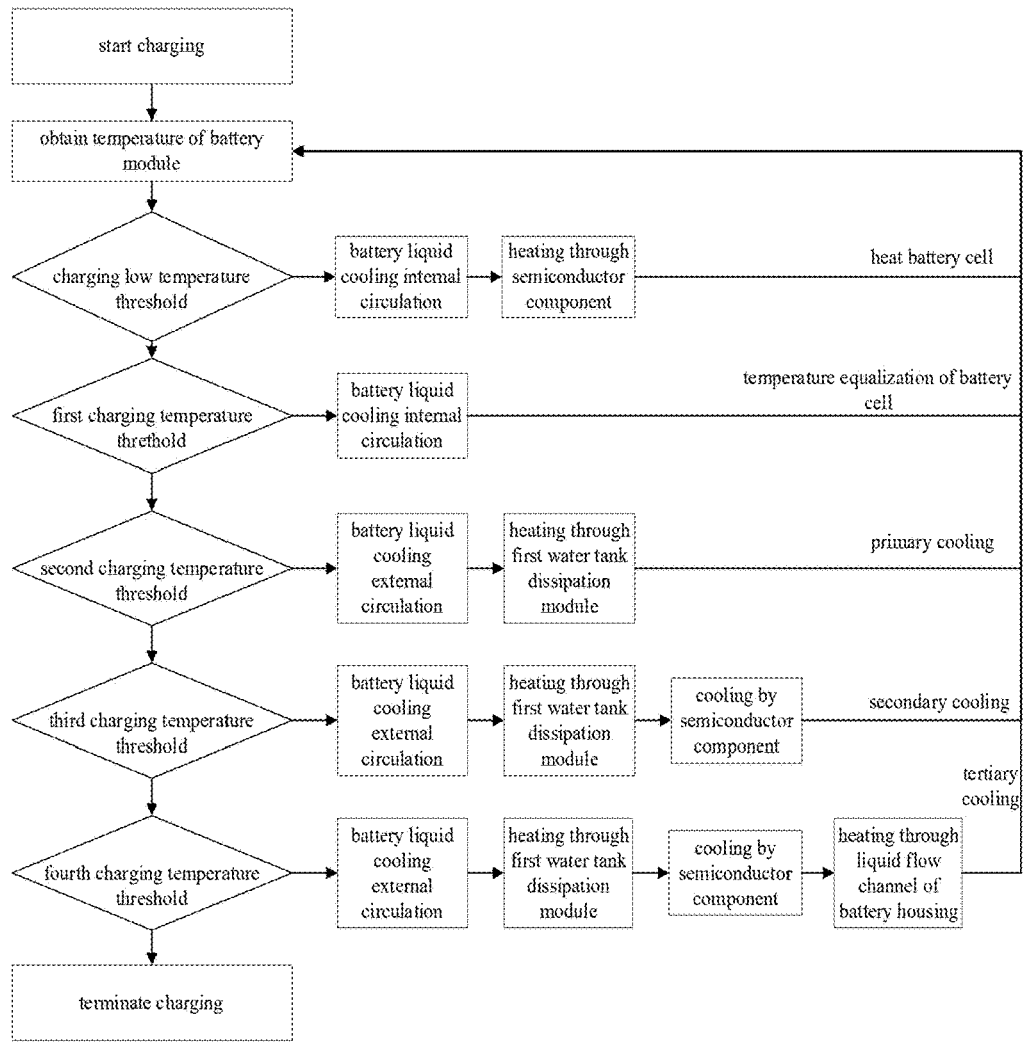
FIG. 17 illustrates a flowchart of a thermal management method of the electric motorcycle being in a charging condition in accordance with one embodiment of the present application.

As shown in FIG. 17, in the charging condition, when the temperature value of the battery module 500 is lower than the charging low temperature threshold, the thermal management controller 600 controls the second water inlet of the first control valve 330 to be connected to the water outlet of the first control valve 330 (port 2 and port 3 of the first control valve 330 shown in FIG. 3 are connected), and the semiconductor component 340 is controlled to heat the liquid in the liquid flow channel 5212 of the battery module. This stage is referred to as heating battery cell. Specifically, the thermal management controller 600 controls the semiconductor chilling plate 342 in the semiconductor component 340 to be flowed through by a reverse current, in this way, a surface A of the semiconductor chilling plate 342 is converted into a heating surface, and the liquid in the heat-cold exchange liquid flow channel 3431 in the heat exchange structure 343 is heated by the semiconductor chilling plate 342. Since the heat-cold exchange liquid flow channel 3431 is connected to the liquid flow channel 5212 of the battery module, the liquid in the liquid flow channel 5212 of the battery module may be heated through liquid cooling internal circulation, and the battery module 500 is heated accordingly.

When the temperature value of the battery module 500 is higher than the charging low temperature threshold and is lower than the first charging temperature threshold, the thermal management controller 600 controls the second water inlet of the first control valve 330 to be connected to the water outlet of the first control valve 330 (port 2 and port 3 of the first control valve 330 shown in FIG. 3 are connected), and the semiconductor component 340 is controlled to stop heating. This stage is referred to as temperature equalization of the battery cell.

When the temperature value of the battery module 500 is higher than the first charging temperature threshold and is lower than the second charging temperature threshold, the thermal management controller 600 controls the first water inlet of the first control valve 330 to be connected to the water outlet of the first control valve 330 (port 1 and port 3 of the first control valve 330 shown in FIG. 3 are connected), to enable the liquid in the liquid flow channel 5212 of the battery module to circulate with the liquid in the first water tank cooling module 310, thereby dissipating the heat of the battery module 500 through the first water tank cooling module 310. This stage is referred to as primary cooling.

When the temperature value of the battery module 500 is higher than the second charging temperature threshold and is lower than the third charging temperature threshold, the thermal management controller 600 controls the first water inlet of the first control valve 330 to be connected with the water outlet of the first control valve 330 (port 1 and port 3 of the first control valve 330 shown in FIG. 3 are connected), and controls the semiconductor component 340 to cool the liquid in the liquid flow channel 5212 of the battery module. This stage is referred to as a secondary cooling. That is, on the basis of cooling the battery module 500 by the first water tank cooling module 310, the semiconductor component 340 is also used to cool the battery module 500 so as to improve the heat dissipation effect of the battery module 500. Specifically, the thermal management controller 600 controls the semiconductor chilling plate 342 in the semiconductor component 340 to be flowed through by a forward current, in this way, the surface A of the semiconductor chilling plate 342 is transformed into a cooling surface, and the liquid in the heat-cold exchange liquid flow channel 3431 in the heat exchange structure 343 is cooled by the semiconductor chilling plate 342. Since the heat-cold exchange liquid flow channel 3431 is connected to the liquid flow channel 5212 of the battery module, the liquid in the liquid flow channel 5212 of the battery module may be cooled through the liquid cooling external circulation. Thus, the battery module 500 is cooled.

In some embodiments, as shown in FIG. 17, the preset charging temperature threshold further includes a fourth charging temperature threshold. In the charging condition, when the temperature value of the battery module 500 is higher than the third charging temperature threshold and is lower than the fourth charging temperature threshold, the thermal management controller 600 controls the first water inlet of the first control valve 330 to be connected with the water outlet of the first control valve 330 (port 1 and port 3 of the first control valve 330 shown in FIG. 3 are connected), and controls the semiconductor component 340 to cool the liquid in the liquid flow channel 5212 of the battery module. The thermal management controller 600 also controls the second control valve 430 (port 4 and port 6 of the second control valve shown in FIG. 3 are connected) to allow the liquid in the liquid flow channel 460 of the battery housing to circulate with the liquid in the second water tank cooling module 410. This stage is referred to as tertiary cooling. Since the motor is not in operation during the charging process, there is no need to dissipate heat for the motor. Thus, in addition to dissipating heat for the battery module 500 through the first water tank cooling module 310 and cooling the battery module 500 through the semiconductor component 340, the surface B of the semiconductor chilling plate 342 may be cooled through the liquid flow channel 460 of the battery housing to further improve the heat dissipation effect on the battery module 500.

Figure 18:
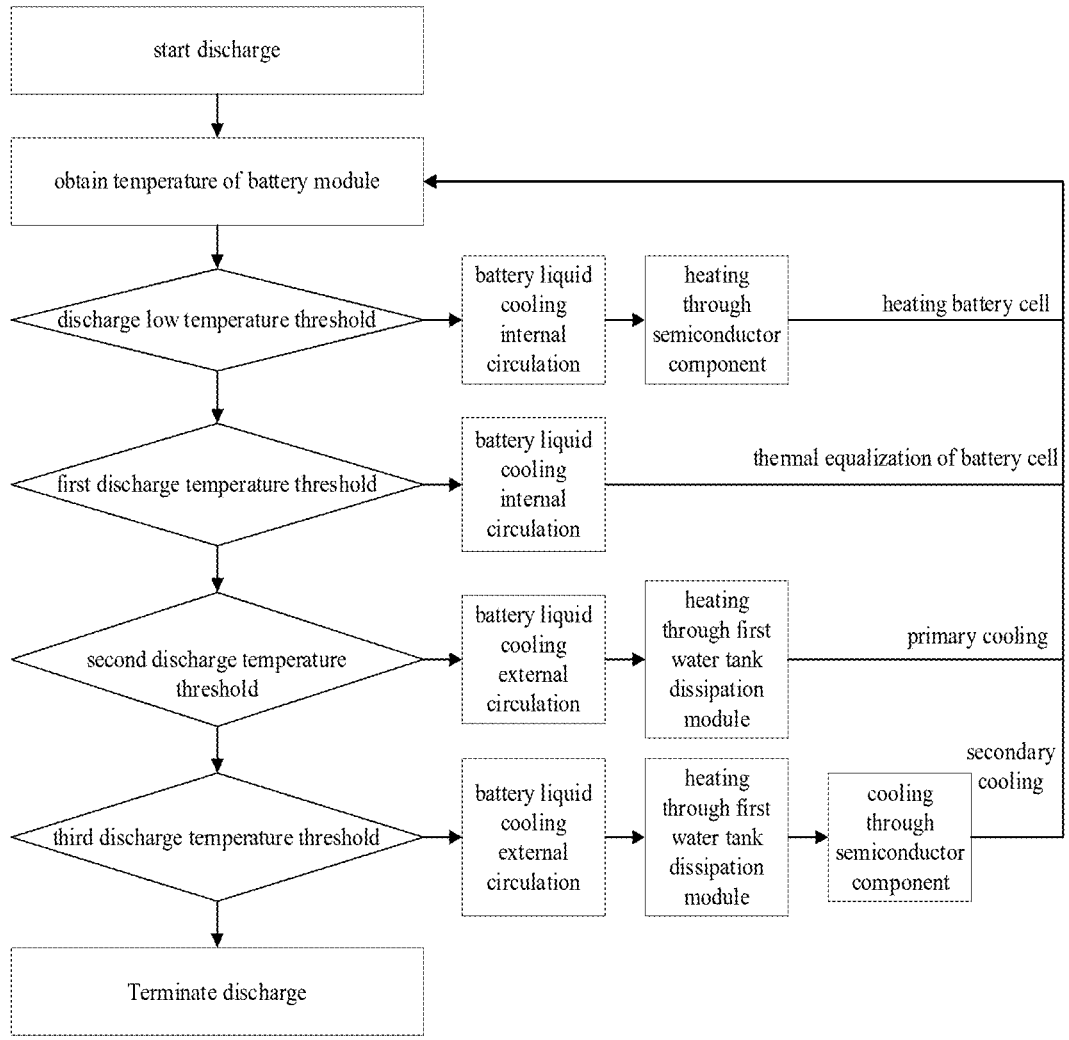
FIG. 18 illustrates a flowchart of the thermal management method of the electric motorcycle being in a discharge condition in accordance with one embodiment of the present application.

In some embodiments, as shown in FIG. 17 and FIG. 18, in the charging condition, when the temperature value of the battery module 500 is higher than the fourth charging temperature threshold, the charging power of the battery module 500 is reduced or the battery module 500 is controlled to stop charging to ensure the safety of the battery module 500. Specifically, the thermal management controller 600 may control the BMS so as to control the charging power and the charging state of the battery module 500. In the discharge condition, when the temperature value of the battery module 500 is higher than the third discharge temperature threshold, the discharge power of the battery module 500 is reduced or the battery module 500 is controlled to stop discharging, thus, the safety of the battery module 500 is ensured. Specifically, the thermal management controller 600 may control the BMS so as to control the discharge power and the discharge state of the battery module 500.

As shown in FIG. 18, int the discharge condition, when the temperature value of the battery module 500 is lower than the discharge low temperature threshold, the thermal management controller 600 controls the second water inlet of the first control valve 330 to be connected to the water outlet of the first control valve 330 (port 2 and port 3 of the first control valve 330 shown in FIG. 3 are connected), and the semiconductor component 340 is controlled to heat the liquid in the liquid flow channel 5212 of the battery module. This stage is referred to as heating of the battery cell. Specifically, the thermal management controller 600 controls the semiconductor chilling plate 342 in the semiconductor component 340 to be flowed through by a reverse current, in this way, the surface A of the semiconductor chilling plate 342 is converted into a heating surface, and the liquid in the heat-cold exchange liquid flow channel 3431 in the heat exchange structure 343 is heated by the semiconductor chilling plate 342. Since the heat-cold exchange liquid flow channel 3431 is connected to the liquid flow channel 5212 of the battery module, the liquid in the liquid flow channel 5212 of the battery module may be heated through the liquid cooling internal circulation, and the battery module 500 is heated accordingly.

When the temperature value of the battery module 500 is higher than the discharge low temperature threshold and is lower than the first discharge temperature threshold, the thermal management controller 600 controls the second water inlet of the first control valve 330 to be connected to the water outlet of the first control valve 330 (port 2 and port 3 of the first control valve 330 shown in FIG. 3 are connected), and the semiconductor component 340 is controlled to stop heating. This stage is referred to as temperature equalization of the battery cell.

When the temperature value of the battery module 500 is higher than the first discharge temperature threshold and is lower than the second discharge temperature threshold, the thermal management controller 600 controls the first water inlet of the first control valve 330 to be connected to the water outlet of the first control valve 330 (⅓ of the first control valve 330 in FIG. 3 are connected), such that the liquid in the liquid flow channel 5212 of the battery module and the liquid in the first water tank cooling module 310 are circulated, the heat of the battery module 500 is dissipated through the first water tank cooling module 310. This stage is referred to as primary cooling.

When the temperature value of the battery module 500 is higher than the second discharge temperature threshold and is lower than the third discharge temperature threshold, the thermal management controller 600 controls the first water inlet of the first control valve 330 to be connected to the water outlet of the first control valve 330 (port 1 and port 3 of the first control valve 330 shown in FIG. 3 are connected), and controls the semiconductor component 340 to cool the liquid in the liquid flow channel 5212 of the battery module. This stage is referred to as secondary cooling. That is, on the basis of cooling the battery module 500 through the first water tank cooling module 310, the semiconductor component 340 is further used to cool the battery module 500 to improve the heat dissipation effect of the battery module 500. Specifically, the thermal management controller 600 controls the semiconductor chilling plate 342 in the semiconductor component 340 to be flowed through by a forward current. In this way, the surface A of the semiconductor chilling plate 342 is converted into a cooling surface, and the liquid in the heat-cold exchange liquid flow channel 3431 in the heat exchange structure 343 is cooled by the semiconductor chilling plate 342. Since the heat-cold exchange liquid flow channel 3431 is connected to the liquid flow channel 5212 of the battery module, the liquid in the liquid flow channel 5212 of the battery module may be cooled by liquid cooling external circulation. Thus, the battery module 500 is cooled.

In conclusion, the thermal management method of the electric motorcycle provided in the embodiments of the present application includes multiple modes such as heating of battery core, temperature equalization of battery core, primary cooling, secondary cooling and tertiary cooling, etc., which correspond to the various temperature stages of the battery module 500. Thus, it is ensured that the battery module 500 may operate stably in a suitable temperature environment, thereby improving the service life and the safety of the battery module 500, and enabling efficient utilization of the energy in the battery module 500.

The foregoing embodiments are only preferable embodiments of the present application, and should not be regarded as limitations to the present application. Any modification, equivalent replacement, and improvement, which are made within the spirit and the principle of the present application, should all be included in the protection scope of the present application.

What is claimed is:

1. A thermal management system of an electric motorcycle, comprising:
   a battery housing configured to accommodate at least one battery module;
   a motor housing configured to accommodate a motor;
   a first liquid flow loop, wherein the first liquid flow loop flows through the battery module, and a part of structures in the first liquid flow loop are connected to the battery housing, a first control valve is provided in the first liquid flow loop, and the first control valve is configured to control a liquid flow state of the first liquid flow loop;
   a second liquid flow loop comprising a liquid flow channel of the battery housing and a liquid flow channel of the motor housing, wherein the liquid flow channel of the battery housing is formed in the battery housing, the liquid flow channel of the motor housing is formed in the motor housing; a second control valve is provided in the liquid flow channel of the battery housing, and the second control valve is connected to the liquid flow channel of the battery housing and the liquid flow channel of the motor housing, respectively; the second control valve is configured to control a liquid flow state of the liquid flow channel of the battery housing and a liquid flow state of the liquid flow channel of the motor housing, respectively; and
   a thermal management controller having a signal connection with the first control valve and the second control valve, respectively, wherein the thermal management controller is configured to control the first control valve so as to control the liquid flow state of the first liquid flow loop, the thermal management controller is further configured to control the second control valve so as to control the liquid flow state of the liquid flow channel of the battery housing and a liquid flow state of the liquid flow channel of the motor housing, respectively.

2. The thermal management system according to claim 1, wherein the first liquid flow loop comprises a liquid flow channel of the battery module and a semiconductor component, the liquid flow channel of the battery module is formed in the battery module, the semiconductor component is connected with the battery housing, the semiconductor component is connected with the liquid flow channel of the battery module, the first control valve is connected with the liquid flow channel of the battery module or the semiconductor component, the semiconductor component has a signal connection with the thermal management controller, and the thermal management controller is configured to control the semiconductor component to heat or cool the liquid flow channel of the battery module.

3. The thermal management system according to claim 2, wherein the battery housing has a mounting area, one side of the mounting area is connected to the semiconductor component, and the liquid flow channel of the battery housing is formed on an opposite side of the mounting area.

4. The thermal management system according to claim 3, wherein a plurality of spoiler columns are arranged at intervals in the liquid flow channel of the battery housing.

5. The thermal management system according to claim 4, wherein the plurality of spoiler columns are arranged on a first inner wall of the liquid flow channel of the battery housing, and a projection shape of the plurality of spoiler columns on the first inner wall is a water drop shape.

6. The thermal management system according to claim 4, wherein the semiconductor component is mounted on an inner surface of the mounting area, an outer surface of the mounting area is covered with a cover body, the cover body and the outer surface of the mounting area are enclosed to form the liquid flow channel of the battery housing, and the plurality of the spoiler columns are arranged at intervals on the outer surface of the mounting area.

7. The thermal management system according to claim 6, wherein the outer surface of the cover body is provided with heat dissipation teeth.

8. The thermal management system according to claim 3, wherein each of multiple side walls of the battery housing is provided with the mounting area, one side of each mounting area is connected to the semiconductor component, and the liquid flow channel of the battery housing is formed on an opposite side of the mounting area.

9. The thermal management system according to claim 2, wherein the battery module comprises a liquid cooler, a battery cell holder and a battery cell, the liquid cooler and the battery cell holder are enclosed to form an accommodation space, a plurality of the battery cells are accommodated in the accommodation space, and the liquid cooler is provided with the liquid flow channel of the battery module.

10. The thermal management system according to claim 9, wherein the accommodation space is filled with a thermal conducting adhesive, and the thermal conducting adhesive is provided between the battery cell and the liquid cooler and between two adjacent battery cells.

11. The thermal management system according to claim 10, wherein a plurality of first heat pipes are arranged at intervals in the accommodation space, each of the plurality of first heat pipes comprises two first heat absorption ends and a first heat releasing end, one of the two first heat absorption ends is arranged in a gap between two adjacent battery cells, the first heat releasing end of each of the plurality of first heat pipes is connected to the liquid cooler, and the plurality of first heat pipes are buried in the thermal conducting adhesive.

12. The thermal management system according to claim 11, wherein the first heat pipe is a U-shaped pipe, the U-shaped pipe is provided with two extension parts and one middle part between the two extension parts, the middle part is connected to the two extension parts, respectively, the two extension parts are the two first heat absorption ends, and the middle part is the first heat releasing end.

13. The thermal management system according to claim 10, wherein the plurality of battery cells are connected to the battery cell holder, the thermal conducting adhesive is arranged to be spaced from the battery cell holder, and a thermal insulating adhesive is filled in a space between the thermal conducting adhesive and the battery cell holder.

14. The thermal management system according to claim 9, wherein a plurality of the battery modules are accommodated in the battery housing, liquid flow channels of the battery modules in the liquid coolers of the plurality of battery modules are connected in parallel, and the plurality of liquid flow channels of the battery modules are connected with the semiconductor component.

15. The thermal management system according to claim 2, wherein the first liquid flow loop further comprises a first water tank cooling module, a water outlet of the first water tank cooling module is connected to a first water inlet of the first control valve, a water outlet of the first control valve is connected to a water inlet of the semiconductor component, a water outlet of the semiconductor component is connected to a water inlet of the liquid flow channel of the battery module, and a water outlet of the liquid flow channel of the battery module is respectively connected to a water inlet of the first water tank cooling module and a second water inlet of the first control valve.

16. The thermal management system according to claim 1, wherein the second liquid flow loop further comprises a second water tank cooling module, a water outlet of the second water tank cooling module is connected to a water inlet of the second control valve, a first water outlet of the second control valve is connected to a water inlet of the liquid flow channel of the motor housing, a second water outlet of the second control valve is connected to the water inlet of the liquid flow channel of the battery housing, and water outlets of the liquid flow channel of the motor housing and the liquid flow channel of the battery housing are connected to a water inlet of the second water tank cooling module.

17. The thermal management system according to claim 1, wherein the thermal management controller is arranged on a windward side of the battery housing; and/or, an outer surface of the thermal management controller is provided with heat dissipation teeth.

* * * * *